(12) United States Patent
Anzilotti et al.

(10) Patent No.: US 12,482,375 B2
(45) Date of Patent: Nov. 25, 2025

(54) VIRTUAL INTEGRATED MACHINING SIMULATOR

(71) Applicant: Lafayette College, Easton, PA (US)

(72) Inventors: Michael James Anzilotti, Pelham, NY (US); Antoine Giovanni Amblard, London (GB); Brian Kaufmann, Dresher, PA (US); Andrew J. Chilicki, Saint James, NY (US); Garan E. Comfort, Plattsburgh, NY (US); Israel Montero-Sanchez, Chicago, IL (US); Alexander Allen Brown, Freemansburg, PA (US)

(73) Assignee: Lafayette College, Easton, PA (US)

( * ) Notice: Subject to any disclaimer, the term of this patent is extended or adjusted under 35 U.S.C. 154(b) by 361 days.

(21) Appl. No.: 18/060,927

(22) Filed: Dec. 1, 2022

(65) Prior Publication Data

US 2023/0169885 A1    Jun. 1, 2023

Related U.S. Application Data

(60) Provisional application No. 63/264,783, filed on Dec. 1, 2021.

(51) Int. Cl.
*G09B 19/24* (2006.01)
*G09B 9/04* (2006.01)

(52) U.S. Cl.
CPC .............. *G09B 19/24* (2013.01); *G09B 9/04* (2013.01)

(58) Field of Classification Search
CPC ............ G09B 19/24; G09B 9/00; Y10T 82/25
See application file for complete search history.

(56) References Cited

U.S. PATENT DOCUMENTS

| | | | |
|---|---|---|---|
| 6,211,848 B1 * | 4/2001 | Plesniak | G09G 5/00 359/9 |
| 6,985,133 B1 * | 1/2006 | Rodomista | G06F 3/016 345/161 |
| 2002/0133264 A1 * | 9/2002 | Maiteh | G05B 19/4097 700/86 |
| 2019/0041987 A1 * | 2/2019 | Asfour | H04N 21/4325 |

FOREIGN PATENT DOCUMENTS

| | | | | |
|---|---|---|---|---|
| WO | WO-2004095249 A1 * | 11/2004 | | G06F 3/017 |

OTHER PUBLICATIONS

"Machine Guarding", United States Department of Labor Occupational Safety and Health Administration, retrieved Oct. 18, 2020, https://www.osha.gov/etools/machine-guarding.

(Continued)

*Primary Examiner* — Robert J Utama
(74) *Attorney, Agent, or Firm* — Vos-IP, LLC

(57) ABSTRACT

A machining simulator for providing haptic feedback to a user, said simulator comprising a processor coupled to a simulation machine, said processor configured to receive at least one input from said simulation machine to define at least one variable corresponding to a simulation; wherein said at least one variable is defined within a database accessible to said simulator; and upon receipt of the at least one input into said simulation machine, generating a haptic feedback response if the at least one input is greater than or less than a defined range within said database.

19 Claims, 17 Drawing Sheets

(56) References Cited

OTHER PUBLICATIONS

"Slide Presentation: Haptic Rendering", CS277—Experimental Haptics Lecture 2, Stanford University, Spring 2014.
Dahmus, et al., "An Environmental Analysis of Machining", Proceedings of the ASME 2004 International Mechanical Engineering Congress and Exposition, Anaheim, California, USA, Nov. 13-19, 2004, 1-10.
Den Dekker, et al., "Assessing the Usability of Remote Control Servos for Admittance-Controlled Haptic Finger Manipulators", 2016 6th IEEE International Conference on Biomedical Robotics and Biomechatronics (BioRob), Singapore, Jun. 26-29, 2016, 1260-1265.
Feygin, et al., "Haptic Guidance: Experimental Evaluation of a Haptic Training Method for a Perceptual Motor Skill", Proceedings 10th Symposium on Haptic Interfaces for Virtual Environment and Teleoperator Systems. HAPTICS 2002, Orlando, FL, USA, Mar. 24-25, 2002, 40-47.
Kyratsis, et al., "Prediction of Thrust Force and Cutting Torque in Drilling Based on the Response Surface Methodology", Machines, vol. 6, No. 2, art. 24, Jun. 4, 2018, 1-12.
Liang, et al., "High Efficiency Skill Training of Lathe Boring Operations by a Virtual Reality Environment", 2012 IEEE International Conference on Mechatronics and Automation, Chengdu, China, Aug. 5-8, 2012, 285-290.
Sizlayan, et al., "Design of Programmable, High-Fidelity Haptic Paddle", 2019 International Aegean Conference on Electrical Machines and Power Electronics (ACEMP) & 2019 International Conference on Optimization of Electrical and Electronic Equipment (OPTIM), Istanbul, Turkey, Aug. 27-29, 2019, 540-546.
Umbert, Cutting Forces in Turning Operations, 2018.
Wang, et al., "Design and Rapid Construction of a Cost-Effective Virtual Haptic Device", IEEE/ASME Transactions on Mechatronics, vol. 26, No. 1, Jun. 10, 2020, 66-77.
Wang, et al., "Study on Welder Training by Means of Haptic Guidance and Virtual Reality for Arc Welding", 2006 IEEE International Conference on Robotics and Biomimetics, Kunming, China, Dec. 17-20, 2006, 954-958.

* cited by examiner

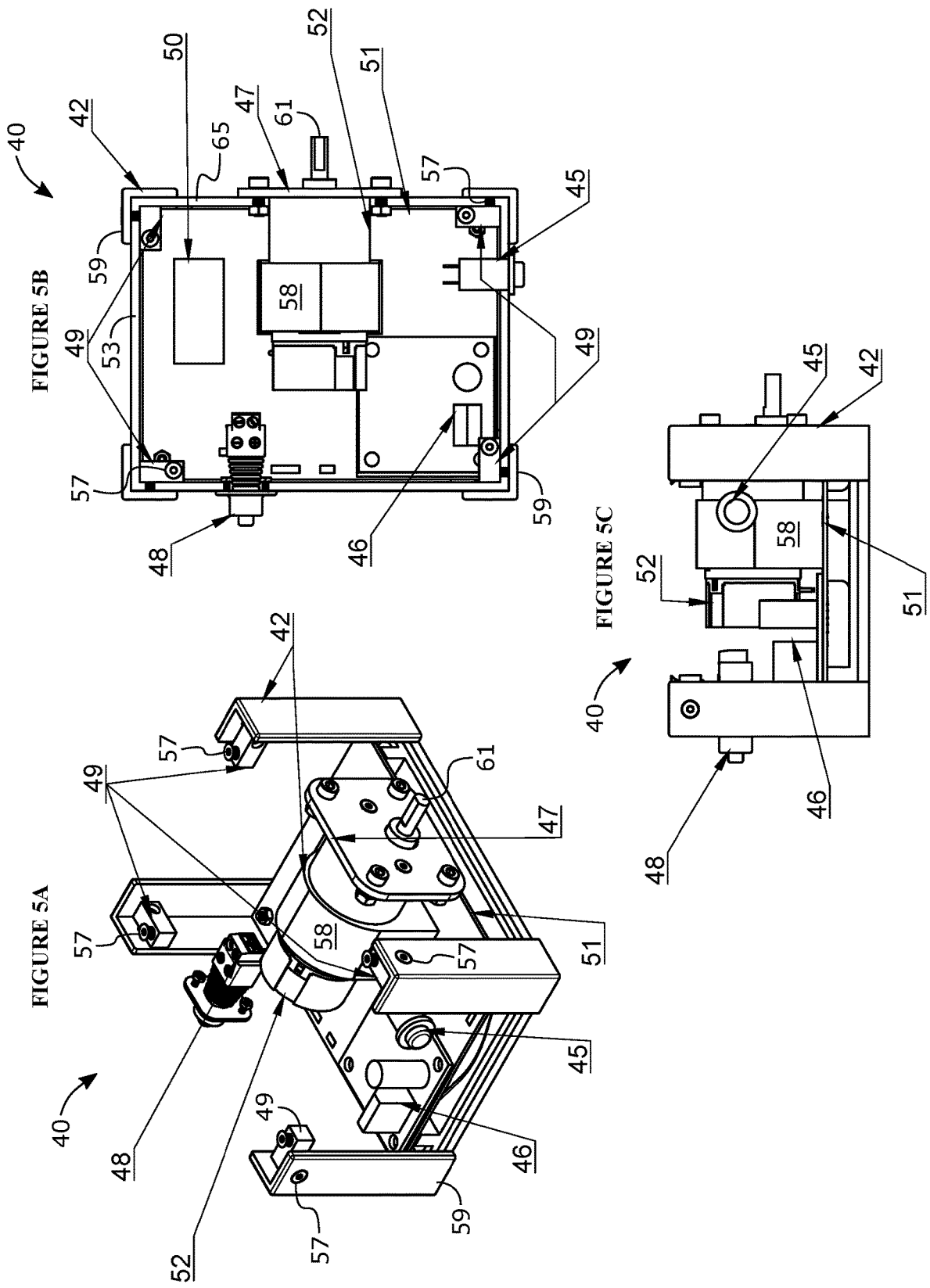

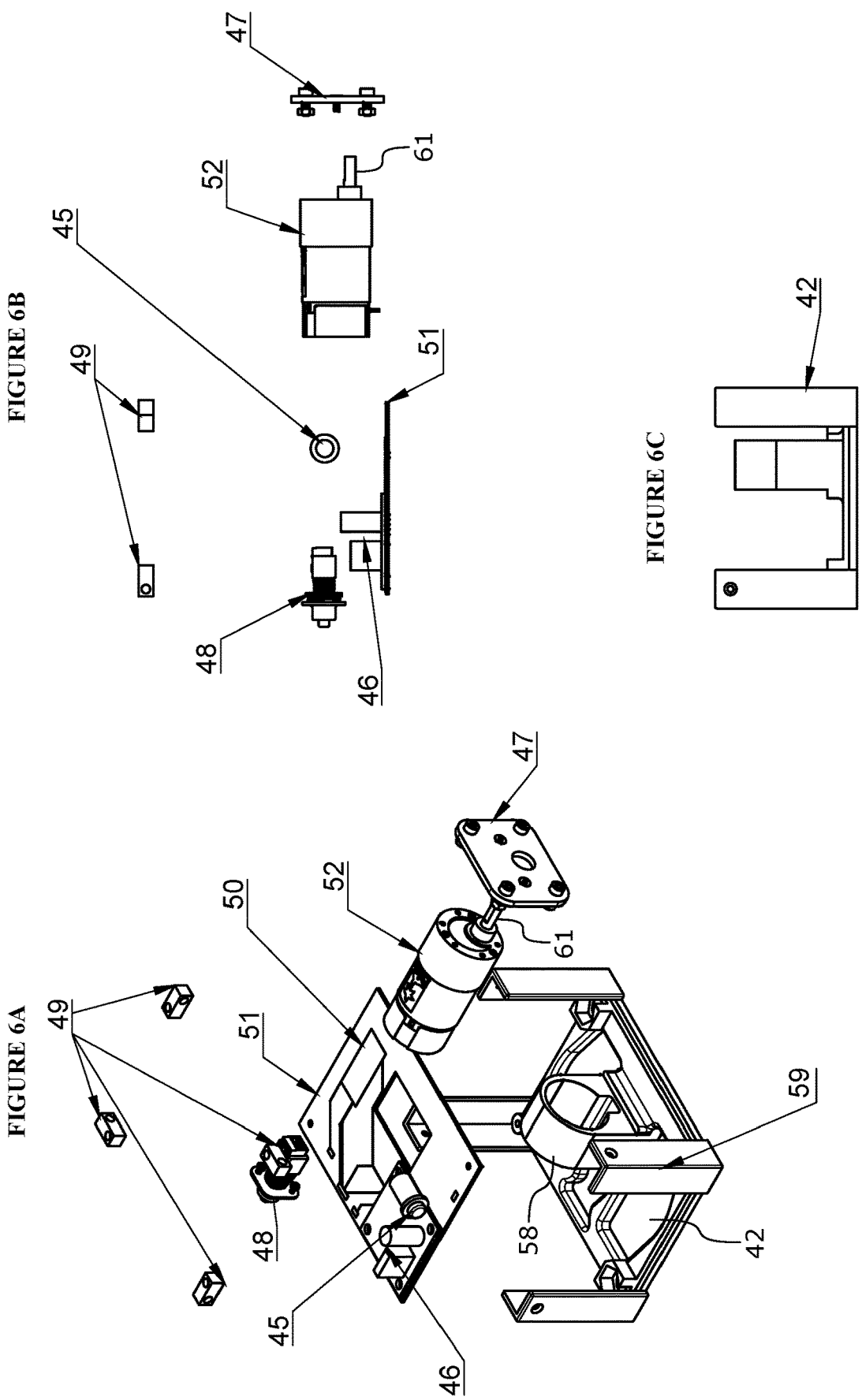

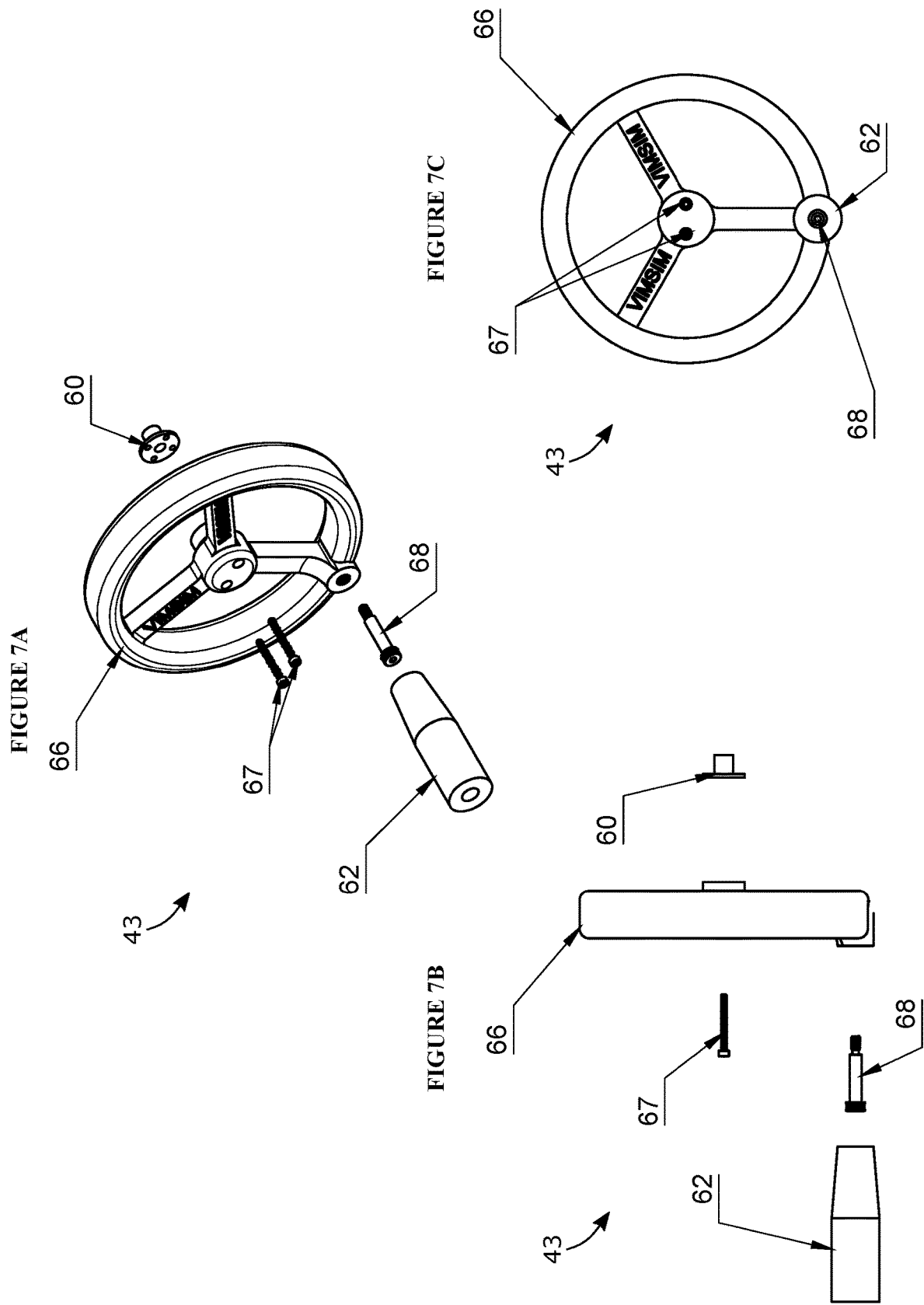

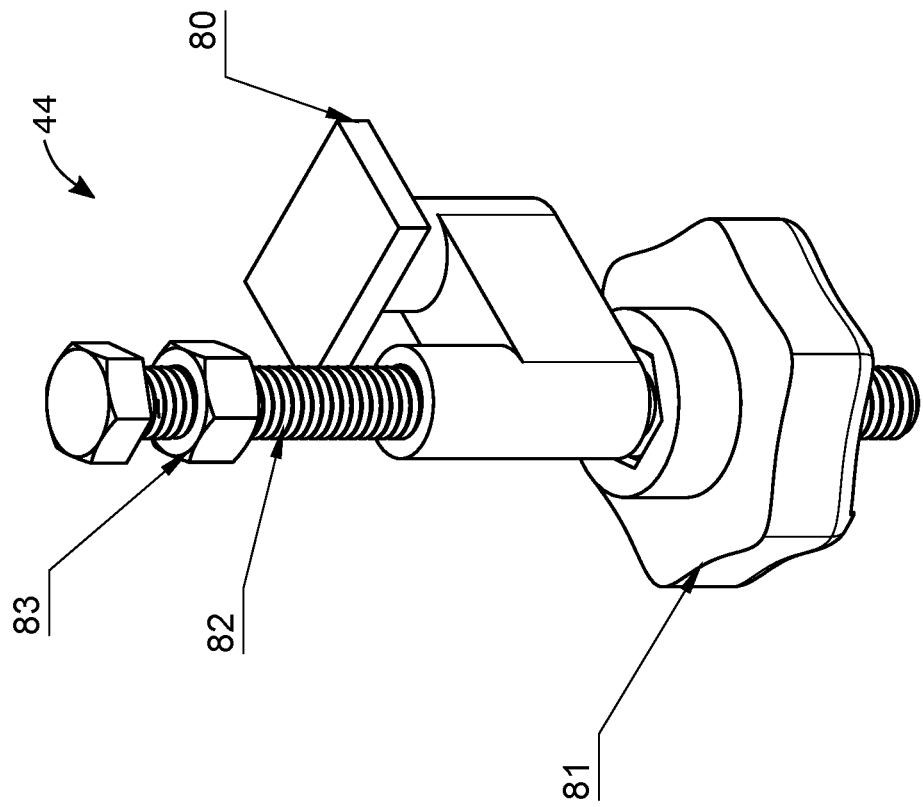
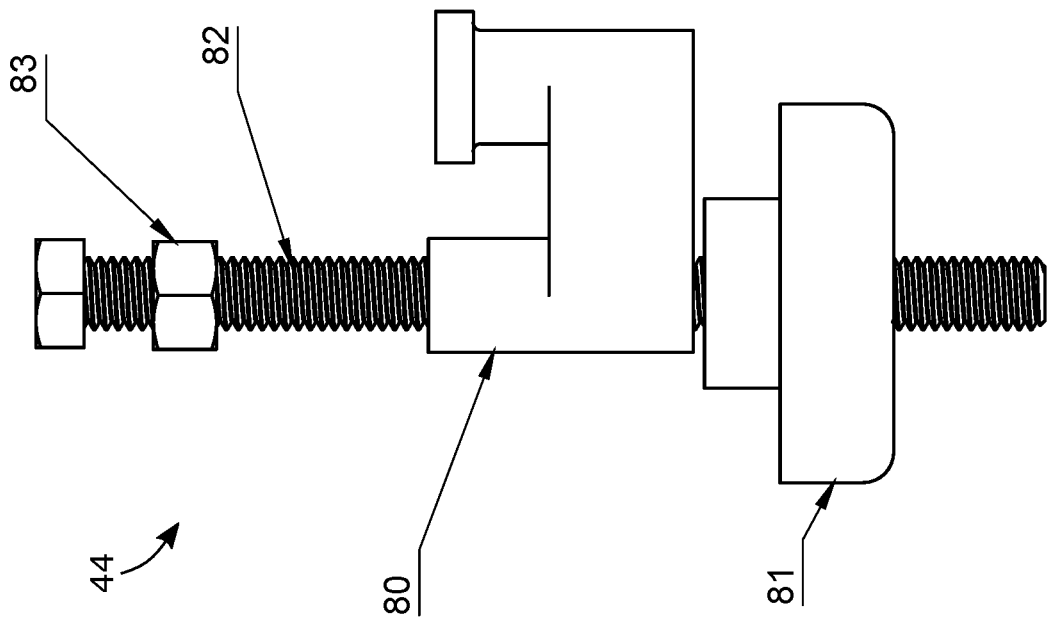

| Transition | Start State | Condition | End State |
|---|---|---|---|
| A | Waiting | Stopped | Waiting |
| B | Waiting | Forward | Forward |
| C | Forward | !Backward && !Stopped | Forward |
| D | Forward | Backward | Backward |
| E | Backward | !Stopped && !Forward | Backward |
| F | Backward | Stopped | Waiting |
| G | Backward | Forward | Forward |
| H | Forward | Stopped | Waiting |
| I | Waiting | Backward | Backward |

FIGURE 12B

| Transition | Start State | Condition | End State |
|---|---|---|---|
| A | Cleared | $LT_{material}$ | Cleared |
| B | Cleared | $GT_{material}$ | Drilling |
| C | Drilling | $GT_{material}$ && $LT_{clogged}$ | Drilling |
| D | Drilling | $GT_{clogged}$ | Clogged |
| E | Clogged | $GT_{clogged}$ | Clogged |
| F | Clogged | $LT_{clogged}$ | Clearing |
| G | Clearing | $GT_{cleared}$ && $LT_{material}$ | Clearing |
| H | Clearing | $LT_{cleared}$ | Cleared |
| I | Clearing | $GT_{material}$ | Drilling |
| J | Drilling | $LT_{material}$ | Clearing |
| | LT = Less Than | GT = Greater Than | |

FIGURE 12C

| Variable | Key |
|---|---|
| $LT_{cleared}$ | $Drill_{depth} \leq Cleared_{depth}$ |
| $LT_{clogged}$ | $Drill_{depth} < Clogged_{depth}$ |
| $GT_{cleared}$ | $Drill_{depth} > Cleared_{depth}$ |
| $GT_{clogged}$ | $Drill_{depth} \geq Clogged_{depth}$ |
| $LT_{material}$ | $Drill_{depth} \geq Workplace_{depth\_saved}$ |
| $GT_{material}$ | $Drill_{depth} < Workplace_{depth\_saved}$ |
| LT = Less Than | GT = Greater Than |

VIRTUAL INTEGRATED MACHINING SIMULATOR

CROSS-REFERENCE TO RELATED APPLICATIONS

This application claims the benefit of U.S. Provisional Patent Application No. 63/264,783 filed on Dec. 1, 2021, with the United States Patent and Trademark Office, the contents of which are incorporated herein by reference in their entirety.

FIELD OF THE INVENTION

The invention is related to haptic feedback devices and related methods of use.

BACKGROUND OF THE INVENTION

Manufacturing has long been held as the backbone of the economy of industrialized nations. Machine shops manufacture end-products largely made of metal or plastic to be sold to customers in the machine industry, the car industry, the aircraft industry, or others. Machine shops and other manufacturing facilities typically include machines such as lathes, milling machines, machining centers, drill press and grinding machines, amongst other things. Machines can be operated manually or they can be CNC machines (computer numerical control).

All manual lathes have common components that are generally known in the art. FIG. 1 is an example of such manual lathe. Certain key components that are relevant for understanding the present invention include: (i) the headstock assembly (1) with the spindle (2); (ii) the carriage assembly (3) which contains the tool post (4) with a compound (6) and a cross slide (5) controlled by cranking a cross slide handwheel (7) to move the tool post (4), a carriage assembly handwheel (8) to move the carriage assembly (3) along the lead screw (9) and feed rod (10); and (iii) the tailstock assembly (11) which contains the tailstock quill (12) for receiving a drill bit and the tailstock handfeed wheel (13) for moving the tailstock assembly along the ways (14).

Likewise, all manual milling machines have common components that are generally known in the art. FIG. 2 is an example of a manual milling machine. Certain key components that are relevant for understanding the present invention include: (i) the head (21) with the quill (22), spindle (23), quill feed handwheel and quill feed hand lever (25); and (ii) the saddle (26) which carries the table (27) which is operated by the table traverse crank handle (28) and the saddle traverse crank (29).

There is also an unmet need for manufacturing workers. Currently in the United States, a significant number of manufacturing jobs are going unfilled. Unfortunately, this is a number that is projected to increase over the next decade. A study conducted in 2018 by Deloitte and the Manufacturing institute predicts that by 2028, 2.4 million manufacturing jobs will go unfilled, risking the United States $2.5 trillion in lost GDP. The three main reasons the study gives for this growing issue is (i) a lack of skilled workers due to misperceptions about what manufacturing entails, (ii) skillsets are shifting towards advanced technologies, and (iii) significant inaccessibility to formal training resulting in low numbers of skilled workers. The present invention addresses these issues by teaching new skills and encouraging people to enter into an industry that they otherwise would not have considered.

The most common pathway to enter the manufacturing profession is to begin with formal training on a manual machine such as a lathe or milling machine. After skills are masted on a manual machine, students learn to operate CNC machine (computer numerical control), a manufacturing process where the user inputs code to control the machine. Because of dangers machines pose, students are taught by professionals. This can be expensive for the student if they need to enroll in a technical school to obtain the training. The alternative route requires a close connection with an experienced machinist under whom the student can apprentice, but with the steady decline in a skilled labor force, it has become increasingly difficult to find qualified mentors. Machining certificates such as those offered by the national accrediting body, NIMS can give new hires an upper hand, but these certificates are unattainable to many without physical manufacturing experience due to a performance test required for certification.

Haptic feedback, which is generally known in the art, is the generation of a force to create a physical experience for the user. One common example of the use of haptic feedback is the vibration of a smartphone when the user pushes a button. The importance and effectiveness of the use of haptic feedback when training machinists on manual machine skills is well documented in the literature, as the particular feel and response from the machine is the essence of how a skilled operator uses the various machinery for precision machining. However, such feedback does not exist in a virtual machine.

There are numerous studies on the relationship between torque, angular velocity of the cutting blade, and feed rate in lathe operations. A 2018 study published in MDPI by Kyratis, et al. titled "Prediction of Thrust Force and Cutting Torque in Drilling Based on the Response Surface Methodology" highlights the current state of drilling force analysis and provides a model for the thrust force and cutting torque related to the feed rate, and diameter of the drilling tool and determines that the variables can be assembled in a second order nonlinear model to accurately predict the behavior of drilling, based on empirical data.

Learning the manufacturing skills required to operate machines such as those depicted in FIG. 1 and FIG. 2 is often costly and inaccessible. Existing virtual machining simulators such as lathe simulators that have been produced in recent years, mainly use visual interfaces without providing for accurate haptic feedback during the drilling/cutting processes. Most importantly, the force feedback of the actual machine, such as a lathe, has yet to be produced.

The present invention addresses the unmet need in the current state of the art by providing an elegant mechanical and virtual simulator that provides accurate haptic feedback, resembling, as closely as possible the feedback of an actual machine, which aids the user during the cutting process. The invention is able to recreate different types of feedback such as the feelings of metal shavings, tool breakage and cutting kickback, amongst other things. Accordingly, the present invention provides for a low-cost virtual lathe or milling machine that combines haptic, visual, and audio renderings, as well as integrated tutorials and activities to assist in learning these skills. This invention can be applied to remote learning environments and to make learning manufacturing skills more accessible.

SUMMARY OF THE INVENTION

In a preferred embodiment, a machining simulator for providing haptic feedback to a user, said machining simulator comprising: a processor coupled to a simulation machine, said processor configured to receive at least one input from said simulation machine to define at least one variable corresponding to a simulation; wherein said at least one variable is defined within a database accessible to said simulator; and upon receipt of the at least one input into said simulation machine, generating a haptic feedback response if the at least one input is greater than or less than a defined range within said database.

In a further embodiment, the machining simulator wherein the defined range is within 15% of an ideal value, which is the value defined within the database corresponding to the particular at least one variable defined by the simulation.

In a further embodiment, the machining simulator wherein the input from the simulation machine is provided via a rotational force.

In a further embodiment, the machining simulator wherein the haptic feedback is proportionally given based on a proximity of the input to an ideal value.

In a further embodiment, the machining simulator wherein the simulation machine is a rotatable wheel or a joystick.

In a further embodiment, the machining simulator wherein the simulation machine receives haptic feedback, wherein the haptic feedback is provided by a motor within said simulation machine that receives a voltage based upon a value of the input. In a further embodiment, the machining simulator wherein the voltage is calculated based upon the following formula: $V_{in}=(R/k_t)(k\Delta x+b\Omega_f+J\dot{\Omega}_f+T_d)$. In a further embodiment, the machining simulator wherein the motor provides a force opposite to the rotation of the simulation machine. In a further embodiment, the machining simulator wherein the motor comprises a metal gearmotor with an encoder wherein the encoder measures the input generated by the simulation machine wherein said motor is connected to the processor, said motor configured to generate an output of an appropriate torque to provide the haptic feedback response.

In a further embodiment, the machining simulator comprising a drill configured for engaging with virtual material wherein there are at least three variables defined within the database, said at least three variables corresponding to depth of the drill in the virtual material, rotational speed and acceleration at which the drill is moving, and coulomb friction torque on the drill.

In a preferred embodiment, a machining simulator comprising: a computer, a computer implemented software running on said computer, a display providing a graphical user interface (GUI), and a simulation input device; wherein said computer further comprises a database, said computer implemented software defining a simulation wherein said simulation comprises a set of data stored within the database; wherein the simulation input device comprises at least a microprocessor to receive and process input and a motor to receive a voltage input to provide a responsive haptic feedback; wherein the simulation input device provides at least one input; and wherein the at least one input is compared to a value within the database and the microprocessor generates a proportional signal to the motor based upon a proximity of the at least one input to the value within the database.

In a further embodiment, the machining simulator wherein the proportional signal is a voltage according to the following formula: $V_{in}=(R/k_t)(k\Delta x+b\Omega_f+J\dot{\Omega}_f+T_d)$.

In a further embodiment, the machining simulator wherein the simulation corresponds to a lathe.

In a further embodiment, the machining simulator wherein the value within the database defines at least an ideal rotation speed or an ideal depth.

In a further embodiment, the machining simulator wherein the input corresponds to a rotation speed or a depth.

In a preferred embodiment, a method of providing a virtual simulation of a machining experience comprising: (a) electing a simulation of a machining experience on a virtual simulation device by a user; (b) identifying a set of data corresponding to said simulation from a database; (c) generating an input value from a rotational device connected to said virtual simulation device; (d) receiving an input generating by said user at a microcontroller on said virtual simulation device; (e) determining an expected input value from the set of data corresponding to said simulation and comparing the input to the expected input value; and (f) generating a proportional electronic signal from the microcontroller to a motor on said virtual simulation device and thereby providing haptic feedback proportional to the difference between the input and the expected input value.

In a further embodiment, the method wherein the simulation corresponds to a lathe, a milling machine, a drill, a tractor, a bulldozer, a crane, or another mechanical machine.

In a further embodiment, the method wherein the proportional difference between the input and the expected input value provides for a 15% variance wherein the input within the 15% variance is deemed the same.

In a further embodiment, the method wherein the rotational device is connected to the motor, wherein said motor comprises an encoder, wherein the encoder rotates with the rotational device and defines a position corresponding to the input value.

In a further embodiment, the method wherein the proportional electronic signal generates said electronic signal to said motor to provide a counterrotational force, which is the haptic feedback.

In a preferred embodiment, a machining simulator comprising: a computer implemented software, a computer comprising a display, and a controller; said controller comprising a motor; wherein said computer implemented software is run on said computer and displayed on said display; wherein the controller is rotated to provide an input which is compared to a predetermined input value stored within a database accessible to said computer; and wherein the input is compared to the predetermined input value and generates a voltage to said motor to provide a torque to said controller.

BRIEF DESCRIPTION OF THE FIGURES

FIGS. 5A, 5B, and 5C depict a detail of the interior of a controller with FIG. 5A being the top perspective view, FIG. 5B being the top view, and FIG. 5C being the side view.

FIGS. 6A and 6B are an exploded view of FIGS. 5A-C depicting a detail of the interior of a controller with FIG. 6A being the top perspective exploded view, FIG. 6B being the side exploded view. FIG. 6C is a side view detail of the bottom plate of the housing.

FIGS. 7A, 7B, and 7C are an exploded view of the handwheel assembly detail with FIG. 7A being the top perspective exploded view, FIG. 7B being the side exploded view and FIG. 7C being the front view.

FIGS. 8A and 8B are a detailed view of the clamping assembly with FIG. 8A being a front view and FIG. 8B being a top perspective view.

FIGS. 12A, 12B, and 12C are the finite state machine, which is programed into the micro controller transition diagram and table for tracking whether the virtual drill is cleared, clearing, drilling, or clogged.

DETAILED DESCRIPTION OF THE INVENTION

Various embodiments are described more fully hereinafter with reference to the accompanying drawings, which form a part hereof, and which show, by way of illustration, specific exemplary embodiments by which the innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, devices, or any similar or equivalent arrangements known to those skilled in the art. Accordingly, the various embodiments may take the form of an entirely hardware embodiment, an entirely software embodiment or an embodiment combining software and hardware aspects. The following detailed description is, therefore, not to be taken in a limiting sense.

The present disclosure herein provides for an integrated machining simulator device, system and method of use, that mimics the machining process on lathes, milling machines and other types of manual or automated machinery by relaying haptic, visual, and audio renderings to its user. As used throughout the present specification, the term "haptic" is understood to mean stimulating the senses of touch and motion, especially to reproduce in remote operation or computer simulation the sensations that would be felt by a user interacting directly with physical objects. Haptic can be resistance, vibration, or force and the term haptic can be used interchangeably with kinesthetic communication or 3D touch. Currently, the state of the art has not captured data on the force of a lathe handle as an operator manually controls input torque and feed rate. The present disclosure provides for a means of collecting data on the net force on the handle during multiple drilling operations and develops a model to fit the data that is collected from the lathe handle itself. Furthermore, drilling forces are measurable and able to be modeled. The embodiments herein measure this data which until now has not been documented. The embodiments herein also derive models for the relationship between radial force and depth of cut in turning operations on the lathe.

The simulator relates variables such as cutting, drill diameter, feed rate, and thrust force to cutting torque, in an algorithm that is used to send a signal to the device controlled by the operator. The simulator consists of several main components, namely, hardware, control system, data collection, the database, tutorials, and the user method of use. The nonlimited embodiments described below are directed to a virtual integrated machining simulator for a lathe but it should be understood that the simulator could also be used to mimic operation of a milling machine or any other manually operated machine known in the art.

Figure 16:
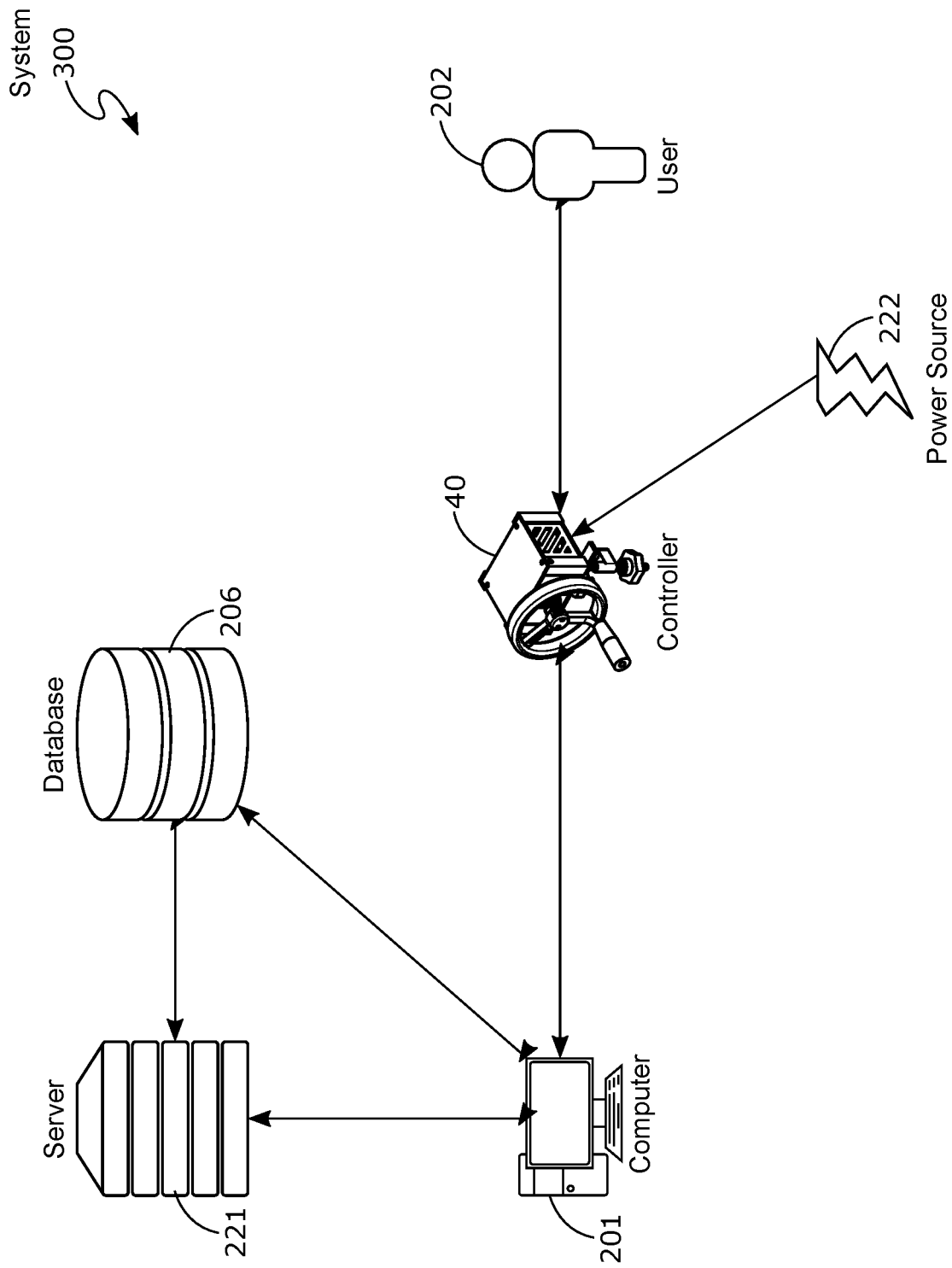
FIG. 16 details an embodiment of the device and system.

The following scenario, shown in FIG. 16 is a nonlimiting example of the use of the entire invention, the details of which will be more fully described throughout the application. A high school purchases a system for use in the classroom setting. The system (300) comprises both hardware and software elements. The software being capable of running on any computing device such as a laptop or tablet. Thus, each computer includes the appropriate hardware, firmware, and software to enable the computer to function as intended. For example, a general-purpose computer may include, without limitation, a chipset, processor, memory, storage, graphics subsystem, and applications. The chipset may provide communication among the processor, memory, storage, graphics subsystem, and applications. The processor may be any processing unit, processor, or instruction set computers or processors as is known in the art. For example, the processor may be an instruction set based computer or processor (e.g., x86 instruction set compatible processor), dual/multicore processors, dual/multicore mobile processors, or any other micro processing or central processing unit (CPU). Likewise, the memory may be any suitable memory device such as Random Access Memory (RAM), Dynamic Random Access memory (DRAM), or Static RAM (SRAM), without limitation. The processor together with the memory may implement system and application software including instructions disclosed herein. Examples of suitable storage includes magnetic disk drives, optical disk drives, tape drives, an internal storage device, an attached storage device, flash memory, hard drives, and/or solid-state drives (SSD), although embodiments are not so limited.

The software can be downloadable such as an app, or nondownloadable such as Web-based or cloud-based software stored on a remote server. The computer (201) should contain typical connectivity features, via wired or wireless connection. For example, a wired connection might be any version of a USB or HDMI connection, and similar. A wireless connection may be WiFi, Bluetooth, Bluetooth Low Energy, RFID, or similar. The computer (201) must be able to access the database (206) which can be stored locally on the computer (201) or can be stored remotely on a server (221). The computer (201) therefore, may or may not communicate with the server in certain embodiments if the database is local. The hardware device consists of a controller (40) such as those shown in FIGS. 3A, 3B, and 3C.

To install the system (300) and hardware device, the controller (40) is affixed to any stationary surface such as a desk, table, or workbench, using the clamping system (44). The controller (40) is connected to the computer (201) either via a wired connection such as USB or a wireless connection such as Bluetooth. The software is either installed on the computer (201) or accessed on a remote server (221) via an Internet connection. The controller (40) is connected to a power source (222) that is either external or internal to the controller (40).

A student using the system (300) and hardware device, enters the classroom setting and confirms that the controller (40) is securely mounted to a stationary surface. The student then connects the controller (40) to the external power source via the male DC power to screw terminal adapter (48) from FIG. 4. The student connects the controller to the computer (201) via USB and launches the software stored on the computer (201) or remote server (221). The student logs into the system (300) and selects the appropriate module. In this nonlimiting example, the module is center drilling a hole using a manual lathe but the module could be any instructional or training module contained within the system on any type of manual machine such as a lathe or milling machine. The computer GUI shows a rendering of the lathe machine selected in this instance on the computer screen.

Next the student calibrates the controller (40) to the software. In this example, the controller (40) serves as a virtual simulator for the tailstock assembly (11) from FIG. 1 with the handwheel (43) from FIGS. 3A, 3B and 3C replacing the tailstock assembly (11) from FIG. 1 but it could also serve as a virtual simulator for any of the handwheels shown in FIG. 1 or 2.

The student starts the module by pressing the appropriate button on the computer GUI. It is understood that pressing a button can be achieved using a mouse, keyboard, joystick, touchscreen, or using designated buttons on the controller. The system loads a virtual piece of stock, in this nonlimiting example, a ⅝" piece of aluminum, into the chuck mounted on the spindle of the virtual lathe displayed on the GUI, which is a virtual representation of headstock assembly (1) and spindle (2) from FIG. 1. Next, the system loads a virtual tool, in this nonlimiting example, a ¼" drill, into the quill of the tailstock assembly of the virtual lathe displayed on the GUI, which is a virtual representation of the tailstock assembly (11) and tailstock quill (12) from FIG. 1. Next, the student presses the appropriate button on the computer GUI to start the lathe. The spindle of the virtual lathe will start to spin at a certain RPM rate either manually set by the student or selected by the system by querying the recommended RPMs for the particular material and tool.

It is now time for the student to begin drilling the virtual hole in the aluminum. The student turns the handwheel (43) of the controller (40) in the clockwise directions. As the student does so, the tailstock assembly of the virtual lathe displayed on the screen will begin to travel closer to the spinning aluminum stock. This simulates the tailstock assembly (11) traveling along the ways (14) so that it is in closer proximity to the spindle (2) from FIG. 1. The student continues to turn the handwheel (43) in the clockwise direction until the drill is touching the aluminum. Once the virtual drill comes in contact with aluminum, the system sends a signal to the controller (40) to create a haptic response, in this instance, the system will increase the tension in the handwheel (43) once the drill comes in contact with the aluminum to simulate the feeling on the tool cutting the material.

As the student continues to turn the handwheel (43), the visual representation of the lathe process will continuously update the view of the virtual lathe so that the drill is cutting into the aluminum. The system will also launch other audio and visual cues via the software such as metal chips coming from the hole or the sound of the drill scraping against the aluminum as the hole is being cut, wherein such visual images or sounds will be displayed. As the hole is drilled deeper, the system will send a signal to the controller (40) to increase the resistance felt in the haptic response. Consequently, it will become more difficult for the student to turn the handwheel (43) in the clockwise direction. Those skilled in the art will know that when drilling a hole using a lathe, at some point, the handwheel (43) will need to be turned in the counterclockwise direction, or it will become impossible to turn the handwheel any further in the clockwise direction to cut the hole deeper. Embodiment #3 discusses how this data was collected and Embodiment #2 discusses the equations used to provide the appropriate haptic feedback in greater detail, but for purposes of this embodiment, the data and equations are known and stored in a database that can be queried by the system. The system queries the database and determines the appropriate equation for providing haptic feedback to a student drilling a ¼" hole into ⅝" aluminum. As the student turns the handwheel (43), the system runs through the sequence more fully described in Embodiment #6 and executes the solid state machine more fully described in Embodiment #2.

In this scenario, as the haptic feedback increases the resistance for the handwheel (43) being turned in the clockwise direction, the student knows that it is time to turn the handwheel in the counterclockwise direction to back the drill out of the aluminum and clear the chips. As the student turns the handwheel (43) in the counterclockwise direction, the haptic feedback being sent to the controller (40) decreases the resistance of the handwheel making it easier to turn and the software updates the view of the virtual lathe so that the drill is being removed from the aluminum stock. Once the student feels that the virtual chips have been cleared, the student again reverses the direction of the handwheel to the clockwise direction starting the next cut. The process starts all over again with the software and system updating the view of the virtual lathe so that the drill is once again moving into the aluminum and the tension on the handwheel increases to simulate cutting.

Haptic feedback is not limited to tension. If the student makes an incorrect cut, the handwheel (43) might also vibrate to simulate the chattering experienced when using a real lathe. Likewise, the system and hardware device are not limited to simulating a virtual lathe and can be used to simulate any manual machine with a handwheel. For example, the student might select a simulation of a milling machine such as that depicted in FIG. 2. In this instance, the handwheel (43) is intended to simulate the table traverse crank handle (28) or the saddle traverse handle (29) from FIG. 2. While the shape of the handwheel may change to more accurately reflect the shape of the actual handles on the manual milling machine, the haptic feedback scenarios will function essentially the same except they will use the appropriate equations for a milling machine.

The various components of the embodiments of the simulator are depicted below, with each able to stand alone, or be combined piecemeal with components from embodiment 1 with any portion of those of the remaining embodiments.

Embodiment 1: Hardware

Figure 1:
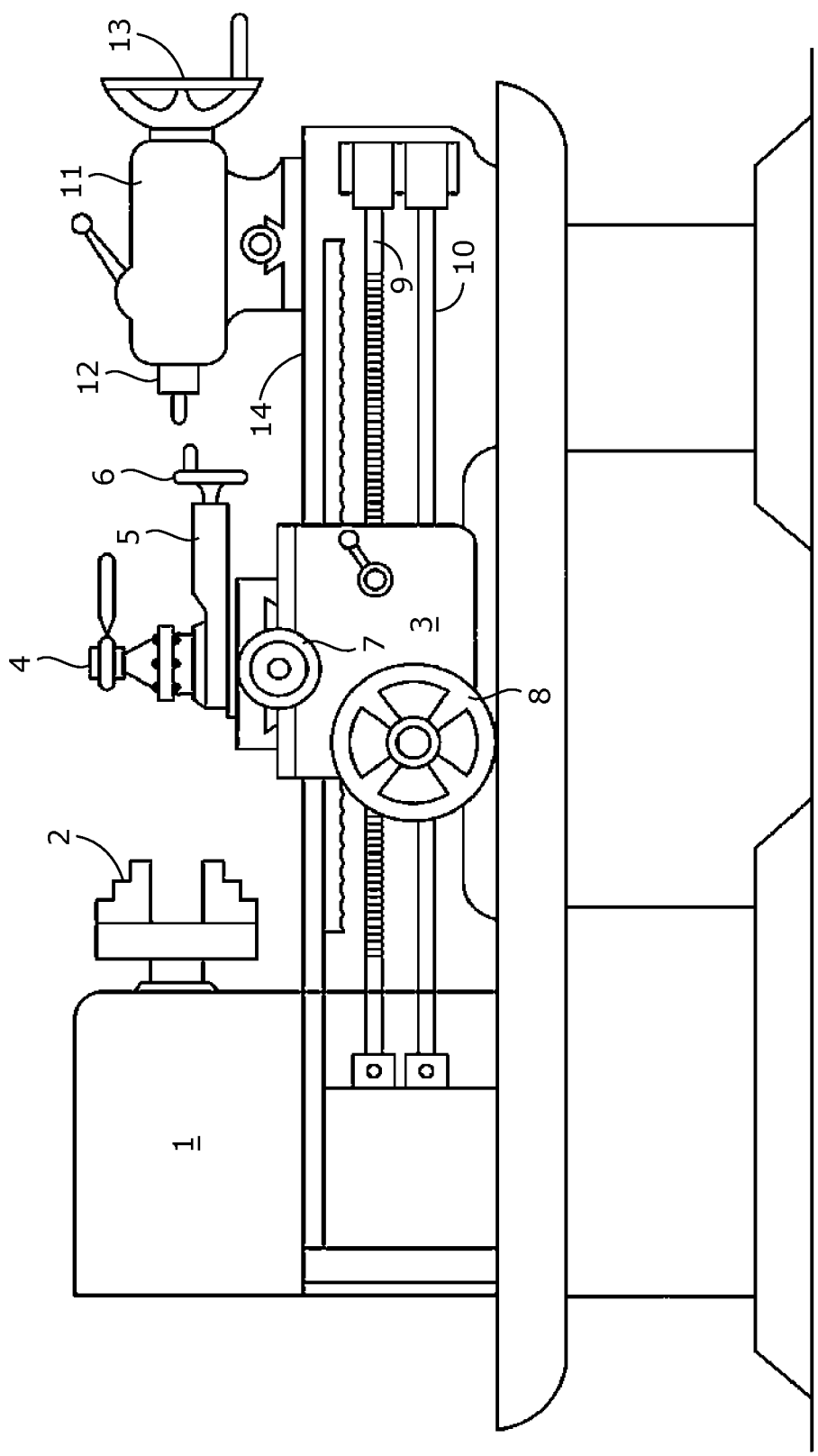
FIG. 1 is an example of a typical manual lathe.
Figure 2:
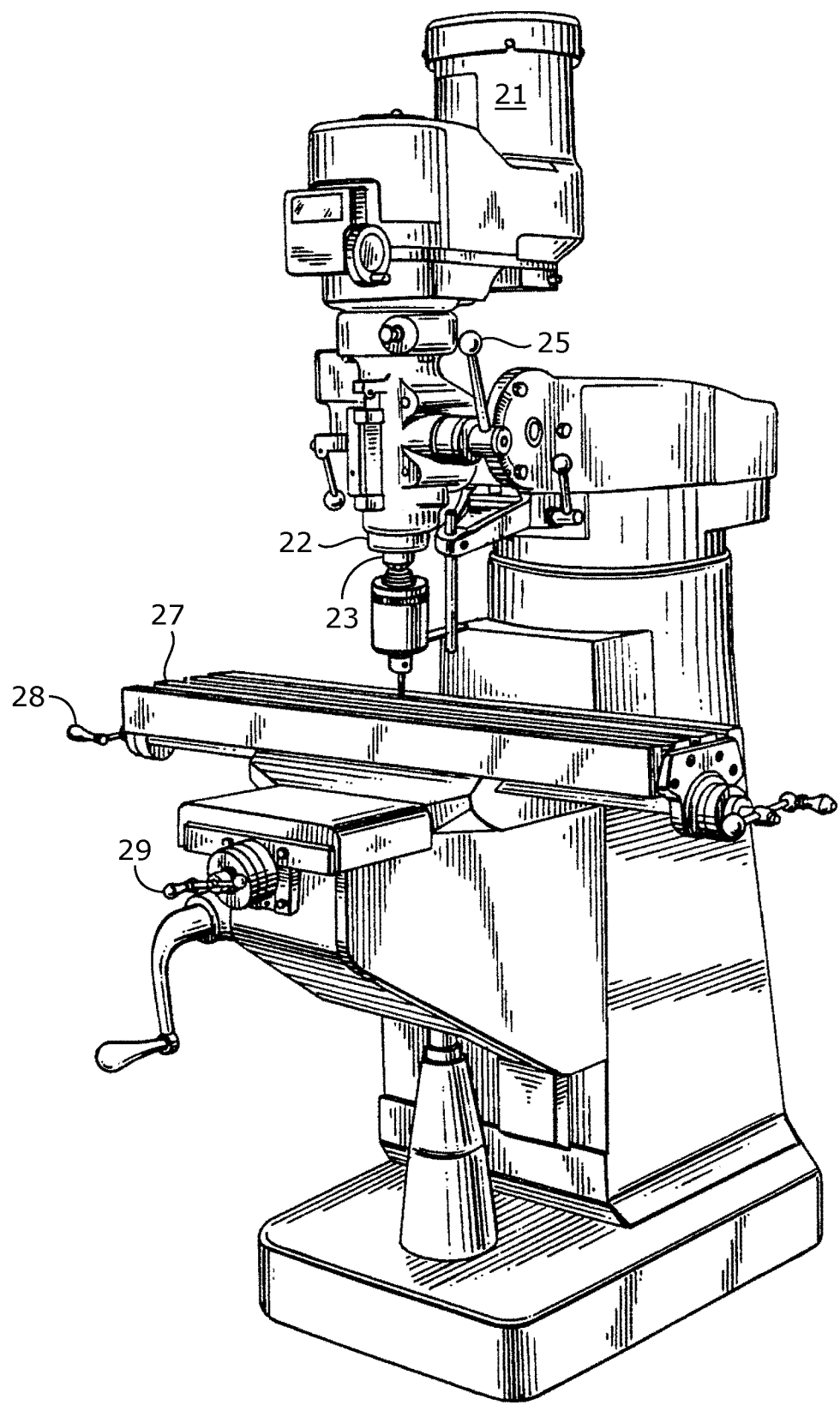
FIG. 2 is an example of a typical manual milling machine.
Figure 3C:
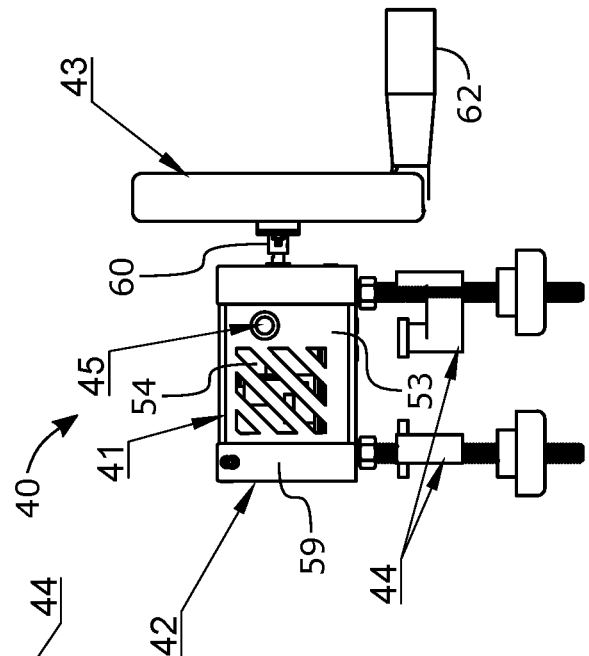
FIGS. 3A, 3B, and 3C depict the exterior of a controller with FIG. 3A being the front view, FIG. 3B being the top perspective view, and FIG. 3C being the side view.
Figure 3B:
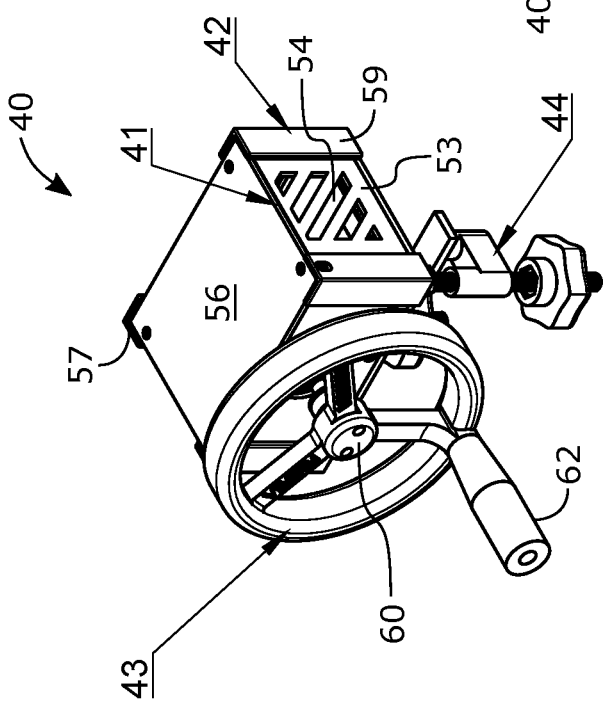
Figure 3A:
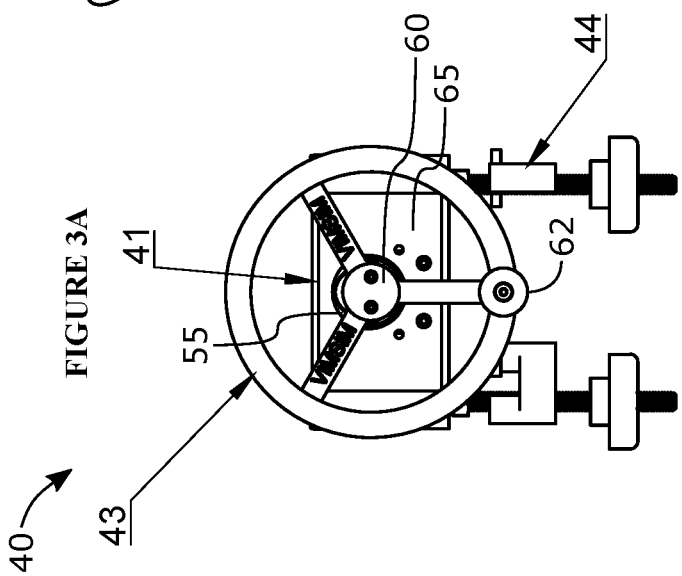

The invention consists of an electro-mechanical hardware component intended to simulate the carriage assembly (FIG. 1C) (3) or the tailstock assembly (FIG. 1B) (11) from the lathe shown in FIG. 1 or the quill feed handwheel, table traverse crank handle (28) or saddle traverse crank handle (29) from the milling machine shown in FIG. 2. FIGS. 3A, 3B and 3C depict the exterior of a controller (40) with FIG.

3A being the front view, FIG. 3B being the top perspective view and FIG. 3C being the side view. The controller (40) is composed of a housing (41). In a preferred embodiment, the housing (41) has four side walls (53) and one top plate (56). The walls (53) and the top plate (56) can be five separate components or they can be one continuous molded or 3D printed until. The walls (53) and the top plate (56) can be made of any lightweight, sturdy material such as plastic, acrylic, metal, metal alloys, composite materials, or other suitable material. If the walls (53) and top plate (56) are separate pieces, each piece can be made from the same or different materials in any number of combinations. If the walls (53) and the top plate (56) are separate pieces, they can be held together with fasteners (57) or the walls may be affixed using, glue, epoxy or any other material generally known in the art for the material selected. One of the walls (53) contains vents (54) to allow for airflow through the controller (40). Another one of the walls (53) contains a hole (55) to accept the front motor plate (47).

Figure 4:
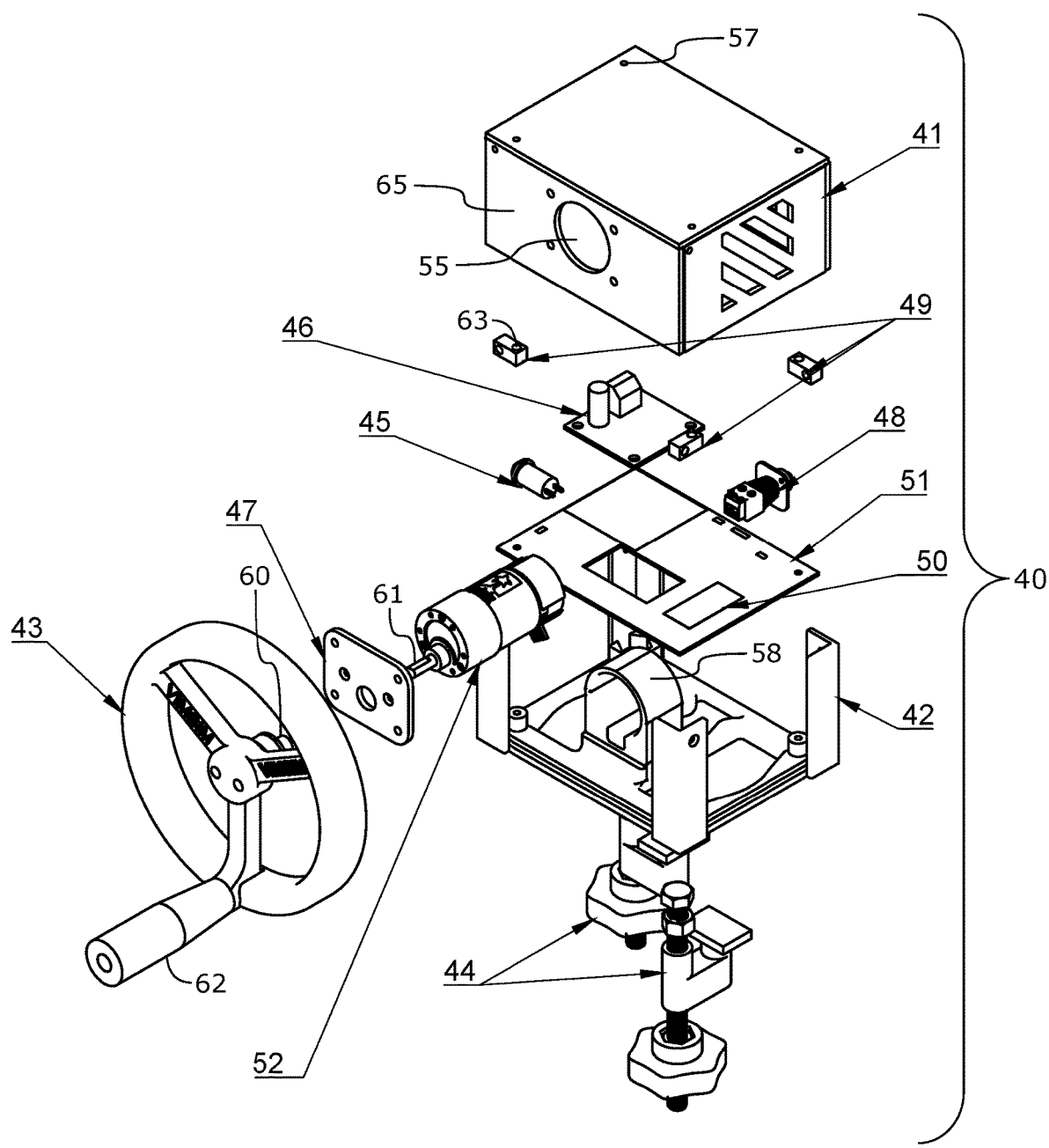
FIG. 4 is an exploded view of the controller shown in FIGS. 3A-C

The bottom of the controller (40) consists of a bottom plate (42) and motor mount (58) shown in FIG. 4. The bottom plate (42) is opposed to the top plate (56). The bottom plate (42) has four corners (59) which can either be molded as part of the bottom plate (42) or attached to the bottom plate (42) via fasteners, glue, epoxy, weld or any other material or method generally known in the art. The bottom plate can be made of any lightweight, sturdy material such as acrylic, 3D printed plastic, metal, such as aluminum, metal alloys, composites, or any other material generally known in the art. When the controller (40) is assembled. The four walls (53) of the housing (41) fit within the four corners (59) of the bottom plate (42).

A handwheel assembly (43) located on the front of the controller (40) has a flange shaft coupling connector (60) which passes through the hole (55) to attached to the motor armature shaft (61) as shown in FIG. 4. The handwheel (43) has a handle (62) for ease of operation. The handwheel assembly (43) is further detailed in FIGS. 7A, 7B and 7C.

A clamping system (44) is attached to the bottom plate (42). The clamping system (44) is further detailed in FIGS. 8A and 8B. One of the walls (53) contains a self-locking latching push button switch (45) which passes through the wall (53) and into the housing (41).

FIG. 4 is an exploded view of the controller (40) shown in FIGS. 3A-C. Within the housing (41) are corner blocks (49) with adjacent threaded holes (63) to receive the fasteners (57) which hold the housing (41) to the bottom plate (42). Contained within the housing (41) is a motor controller (46) a male DC power to screw terminal adapter (48) a microcontroller (50) and a printed circuit board (PCB) (51). Typically, the PCB (51) will be wired to the motor controller, and the microcontroller for simplistic design. The self-locking latch push button switch (45) that is inserted through one of the walls (53) is also contained within the housing (41). The interior surface of the bottom plate (42) has a motor mount (58) that can either be integrally molded into the bottom plate (42) or separately attached to the bottom plate (42). A motor (52) such as a metal gearmotor with a 64 CPR encoder is affixed to the bottom plate (42) using the motor mount (58). A front motor plate (47) fits over the motor armature shaft (61) and goes between the motor (52) and the front wall (65) of the housing (41). The motor armature shaft (61) passes through the hole (55). The flange shaft coupling connector (60) attaches the handwheel (43) to the motor armature shaft (61) completing the controller (40). The microcontroller (50), motor (52), motor controller (46), male DC power to screw terminal adapter (48), and self-locking latch push button switch (45) are all wired to the PCB (51) and are able to communicate with each other through it. This process is more fully described in Embodiment #6 and FIG. 15 which details how the motor (52) will apply a resistive force based on the voltage signal sent by the microcontroller (50) which will be directly felt by the user—which is the haptic feedback.

FIGS. 5A, 5B and 5C depict a detail of the interior of a controller (40) with FIG. 5A being the top perspective view, FIG. 5B being the top view and FIG. 5C being the side view. Specifically, FIG. 5A shows the corner block (49) positioned in the corner (59) to connect the bottom plate (42) to the walls (53) (shown in FIG. 5B) using a fastener (57). FIG. 5A further shows the male DC power to screw terminal adapter (48) passing through one of the walls (53) (shown in FIG. 5B) and the self-locking latching push button switch (45) passing through one of the walls (53) (shown in FIG. 5B). The male DC power to screw terminal adapter (48) is preferably capable of 10A or greater.

The self-latching push button switch (45) is used to trigger events within the simulator, including recalibrating the position of the handwheel (43). It communicates directly to the microcontroller (50). Also depicted is the custom PCB (51) affixed to the bottom plate (42) and the motor controller (46) affixed to the custom PCB (51). Finally, FIG. 5 a shows the motor (52) is affixed to the bottom plate (42) using the motor mount (58) and the motor armature shaft (61) passing through the front motor plate (47) which is attached to the front wall (65) (shown in FIG. 5B).

FIG. 5B is a top view of the configuration depicted in FIG. 5A showing the various components of the controller (40) as mounted to and passing though the walls (53) and the front wall (65). Additionally, FIG. 5B shows the location of the microcontroller (50) relative to the custom PCB (51).

FIG. 5C is a side view of the configuration depicted in FIG. 5A showing the various components of the controller (40) as they relate to one another.

FIGS. 6A and 6B are an exploded view of FIGS. 5A-C depicting a detail of the interior of a controller (40) with FIG. 6A being the top perspective exploded view and FIG. 6B being the side exploded view. FIG. 6C is a side view detail of the bottom plate of the housing.

FIGS. 7A, 7B, and 7C are an exploded view of the handwheel assembly detail with FIG. 7A being the top perspective exploded view, FIG. 7B being the side exploded view and FIG. 7C being the front view. FIG. 7A shows the handwheel (43) consisting of a body (66) and a flange shaft coupling connector (60) which is attached to the body (66) using the fasteners (67). The flange shaft coupling connector (60) connects the handwheel (43) to the motor armature shaft (61) shown in any of FIGS. 3-6. A handle (62) is attached to the body (66) using a fastener (68).

FIGS. 8A and 8B are a detailed view of the clamping system (44) with FIG. 8A being a front view and FIG. 8B being a top perspective view. The clamp (80) holds the controller (40) to a stationary fixture such as a desk. The nut (83) holds the bolt (82) fixed to the housing base. The clamp (80) can freely slide along the bolt (82) and gets locked in place by the handle (81) which has an embedded, threaded lining that can be screwed up or down the bolt (82) and holds the clamp (80) in place. Various other fastening mechanisms may also be utilized to hold the device together. Alternatively, the controller may be integrated into a computing/display unitary unit.

It should be understood that the locations and configurations of certain components and features shown in FIGS. 3-8 is only one possible option and the components and features can be located and configured in any number of ways as is understood by those of ordinary skill in the art. Specifically, many of the components can be replaced by fewer or more elements to create the same function and would be understood as within the scope of this disclosure.

While the present embodiment utilizes a metal gearmotor with a 64 CPR encoder, the motor (52) can be any electric motor, preferably, those which draw less than 5.5 amps, can withstand loads of 1.8 Nm or higher. Furthermore, the output torque of the motor must be able to range from at least 0.1 to at least 1.8 Nm. In a preferred embodiment, the motor (52) is preferable DC and back-drivable to allow the handwheel (43) to rotate in both directions, and has a built-in encoder to measure the user data to be used by the controller to output the appropriate torque. The preferred motor (52) is capable of generating torques between 0.3 Nm and about 10 Nm, inclusive of all forces in between, to correlate with that the data collected on the real lathe showing that the coulomb torque (just spinning the lathe handwheel without drilling into any material) is 0.3 Nm and the max torque felt was around 1.8 Nm when drilling a hole and reaching the "clogged" state. However, in other applications, and using different materials and different size drills, the generated torque may be lower or greater. However, as this is a training tool, it may not be necessary to exert a maximized load in order to provide the necessary training. Therefore, the motor must simply be able to generate the necessary torque for the particular test scenario.

Nonlimiting examples of electronics used in the present embodiment include a PCB, an Arduino Nano microcontroller in charge of interpreting logic, and a motor controller based on widely available high current H-bridge transistors and electric motor and e-stop button and a fan. The h\H-bridge allows the system to switch the polarity of the voltage being applied to the motor (i.e., switch the direction that it spins).

However, in other embodiments for conducting other operations on different materials, it may be desirable to have higher or lower gear ratio to produce more torque. In another preferred embodiment, to avoid the motor wearing down with use, it may be desirable to have a stronger motor whose stall torque is much higher than the average torque need to produce an accurate haptic feedback. The motor preferably comprises an encoder to measure user data for input from the controller to the system. Essentially, it is necessary to measure the rotation of the device, to provide an appropriate input to correspond to the rotation of a wheel on a normal machine. Other mechanisms to measure the rotation can also be utilized.

Still other embodiments may use other mechanisms to provide the proportional torque response. The motor is efficient as a known voltage applied to the motor will produce a known torque response. However, similar mechanical applications may also provide highly reproducible results. Thus, it may be suitable to use a spring loaded tension device, a magnetic resistance mechanism, a friction band, or other mechanisms known in the art to produce a known and reproducible tension force to the wheel.

Machines such as the lathe depicted in FIG. 1 and the milling machine depicted in FIG. 2 typically have an emergency stop button. To simulate the operator experience of being able to quickly find the emergency stop button, the self-locking latching push button switch (45) was added to the controller (40). The self-locking latching push button switch (45) acts as both a recalibration button and as an emergency button where it triggers the machines in the simulator to shut down.

In another embodiment, the controller includes a load cell built into the handwheel (43). In this embodiment, the handwheel uses a slip ring to ensure there are no tangled wires leading from the load cell to the amplifier within the housing. In this embodiment, a breadboard is utilized and the motor is centrally mounted and uses a shaft coupling to shift sizes from the motor shaft size to the slip rings maximum shaft size. In another embodiment, the clamping system (44) is replaced by suction cups. In certain embodiments, a braking mechanism is further included to arrest the movement of the wheel and utilizes a servo.

Embodiment 2: Controller

The controller (40) described in Embodiment 1 provides haptic feedback to the user to simulate actual machining operations via the hardware in the controller (40) such as the motor controller (46), the microcontroller (50) and the custom PCB (51) which communicates either wired, such as via USB, or wirelessly, such as via Bluetooth, with the software on a computer such as a desktop, laptop, tablet, or smartphone. The haptic feedback is achieved via an algorithm based upon collected or known data as certain constants, with the variable data being at least the inputs from a user of the system, i.e., turning of the wheel at a particular rate. While different algorithms will exist for different machining processes, the following nonlimiting example is to simulate using a lathe to drill a ¼" hole into a ⅝" piece of aluminum stock. Those skilled in the art will understand that when manually drilling a hole using a lathe, there are several variables involved namely, the type of material used (i.e., aluminum, steel, brass, nylon, etc.) the diameter of the material (i.e., ½", 1", 2", etc.), the diameter of the hole (i.e., ¼", ½", 1"), the type of drill used (i.e., carbide, high speed steel, cobalt steel, tool steel), the RPMs of the spindle (2), the rate of the manual feed of the tailstock assembly (11), the type and amount of coolant used, the sharpness or dullness of the drill, as well as the rate at which the chips are cleared from hole being drilled.

Figure 10:
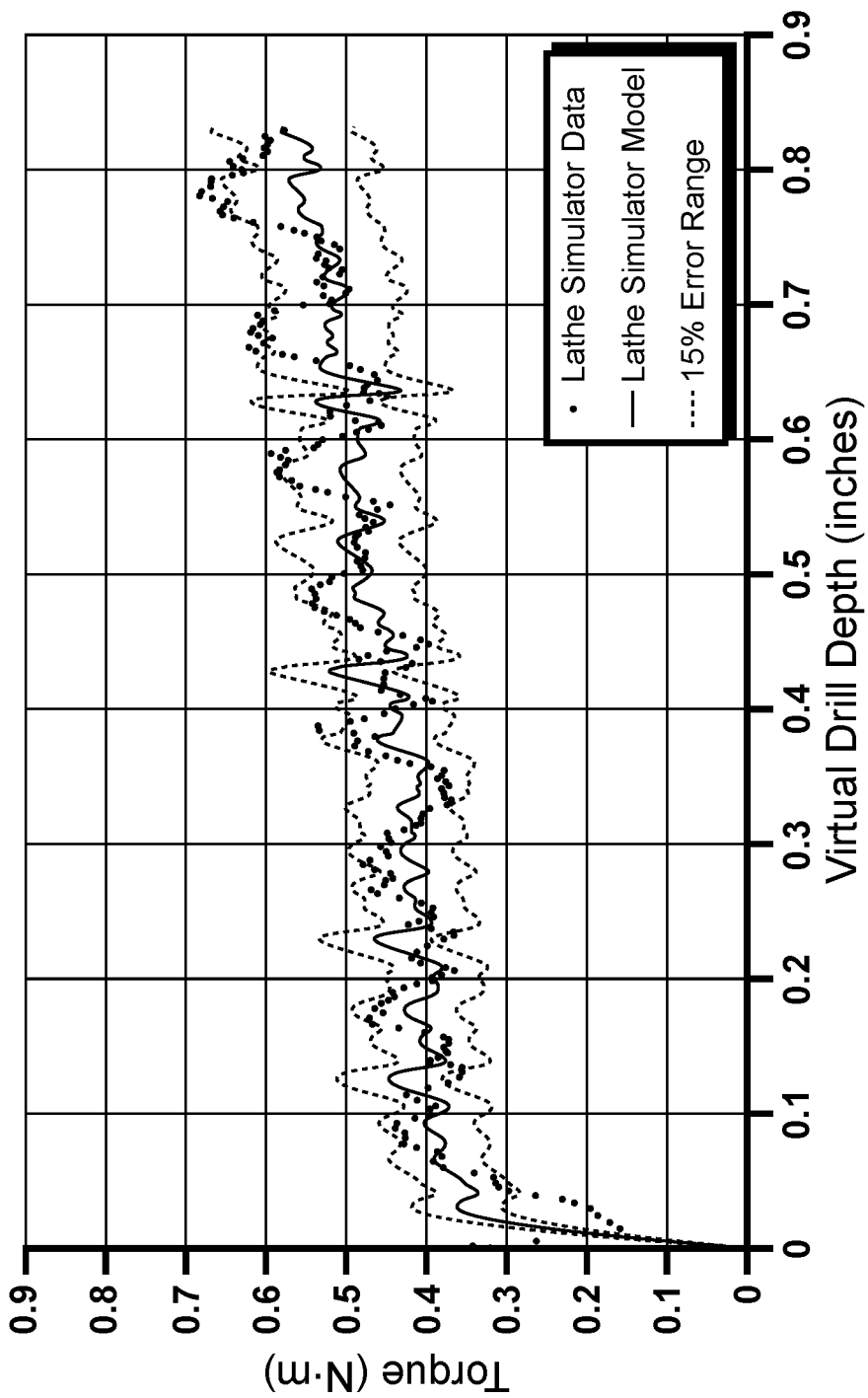
FIG. 10 is a chart showing torque vs. drill depth plot comparing the output torque felt by the user and the output torque that the model predicts.

In view of these variables, the system generates a response feedback (haptic feedback) to the user, to simulate a manual machine. Because the model reliably produces the output torque that is equal to the real machine, the torques felt by the user, as measured by a load cell are within a specified range of the predictive model and are therefore an acceptable simulation for the real operation. The actual torques felt by the operator in the virtual simulator fall within 15% of the predictive model, for example, as determined from the standard deviation of the real lathe torque data. As shown in FIGS. 10, it can be noted that the current controller only deviates slightly outside this range and is within the 15% accuracy.

Figures 11A, 11B:
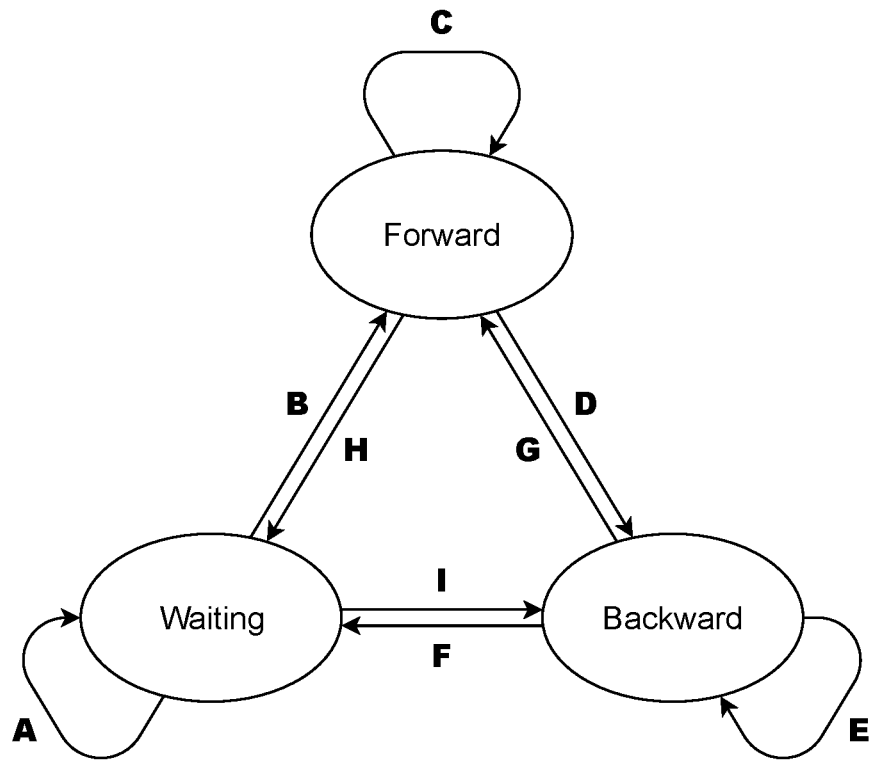
FIGS. 11A and 11B are the finite state machine, which is programed into the micro controller, transition diagram and table for tracking whether the user's lathe handle is stopped, going forwards or backwards.

The controller (40) is programmed such that it outputs the appropriate torques according to the model in Equation 2 at the appropriate situations. In order to run the lathe simulation and implement the controller on a physical device, two finite state machines are used These are both implemented in the microcontroller (50) such as an Arduino®, Raspberry Pi, or other microprocessor as known to those of ordinary skill in the art. The first finite state machine is the state transition diagram and table shown in FIGS. 11A and 11B. This finite state machine tracks states of the position of the virtual drill on the screen and is directly related to the rotational direction of the lathe's handle because in order to determine which direction the drill should move, the direction of the lathe's handle needs to be effectively tracked. This is achieved by the microprocessor tracking the motor's encoder counts. The microprocessor will recognize if the encoder counts are greater than, less than, or equal to the previous count and trigger the virtual drill to move forwards, backwards, or stop.

Figure 12A:
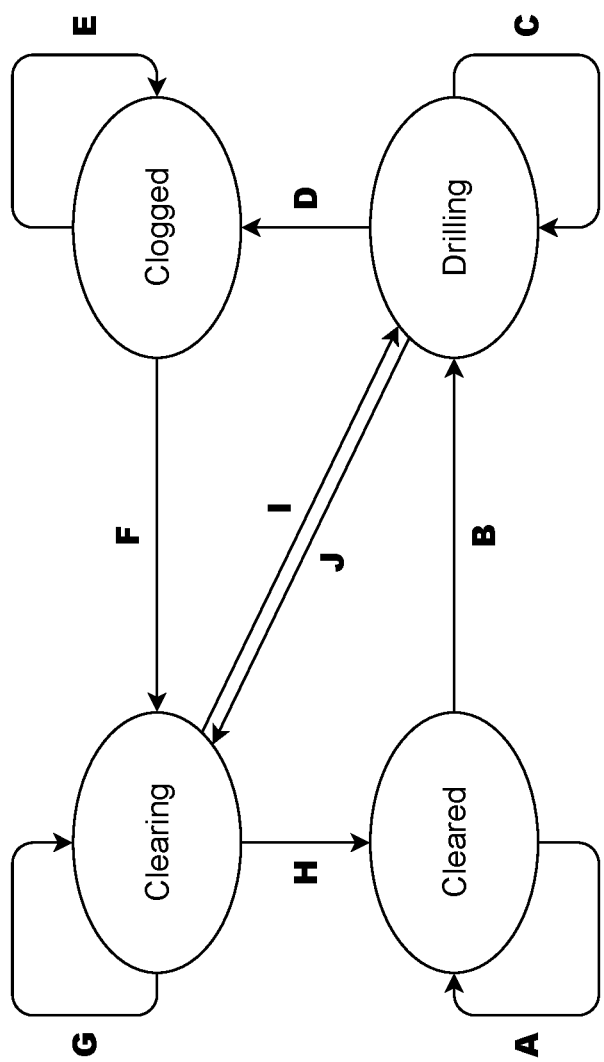

Whether the virtual drill is clogged in the material, cleared of chips, clearing, or drilling is tracked using a second finite state machine, which is programmed into the microcontroller (50), as shown in FIGS. 12A, 12B and 12C. The simulator knows the position of the tip of the drill relative to the borehole opening, and through data collection and mathematical relationships relating the material type and tool diameter, we have determined the depth at which clogging occurs for drilling. This allowed us to create a finite state machine that can accurately track/understand what is happening to the tool, i.e., know whether or not the tool bit is clogged to and sending a corresponding signal to generate a responsive haptic feedback. Based on the particular variables from the user, the haptic feedback will change. This simulates the resistance torque an operator would feel when turning the tailstock handfeed wheel (13) to move the tailstock assembly (11) along the ways (14) to move the tailstock quill (12) holding the drill into the material held in the spindle (2) on the manual lathe shown in FIG. 1. The haptic signal sent to the virtual simulator controller (40) will also be different when the virtual drill is moving forward and clogged vs if it is moving forward and drilling the same as would be experienced in the manual lathe. The system moves from state to state by tracking the virtual drill's position and updating its saved position depending on various factors such as the cleared depth and clogged depth, which are user inputted thresholds. The tracking may be a simultaneous tracking, or provide a position with a latency as much as about 2 seconds. Preferably, the drill position is tracked from between every 0.01 to about every 0.5 seconds to modify the feedback based on the position and feedback at that given moment. Cleared depth refers to how far the user has to back the drill up to clear the chips, and clogged depth refers to how far into the material the user can drill before clogging the drill. In the on example, the clogged depth is 0.83 inches and cleared depth is 0.15 inches. These values have been determined based on data and video collected from the real lathe during data collection but could also be collected from data published in the art based on the given material and tool.

Figure 13:
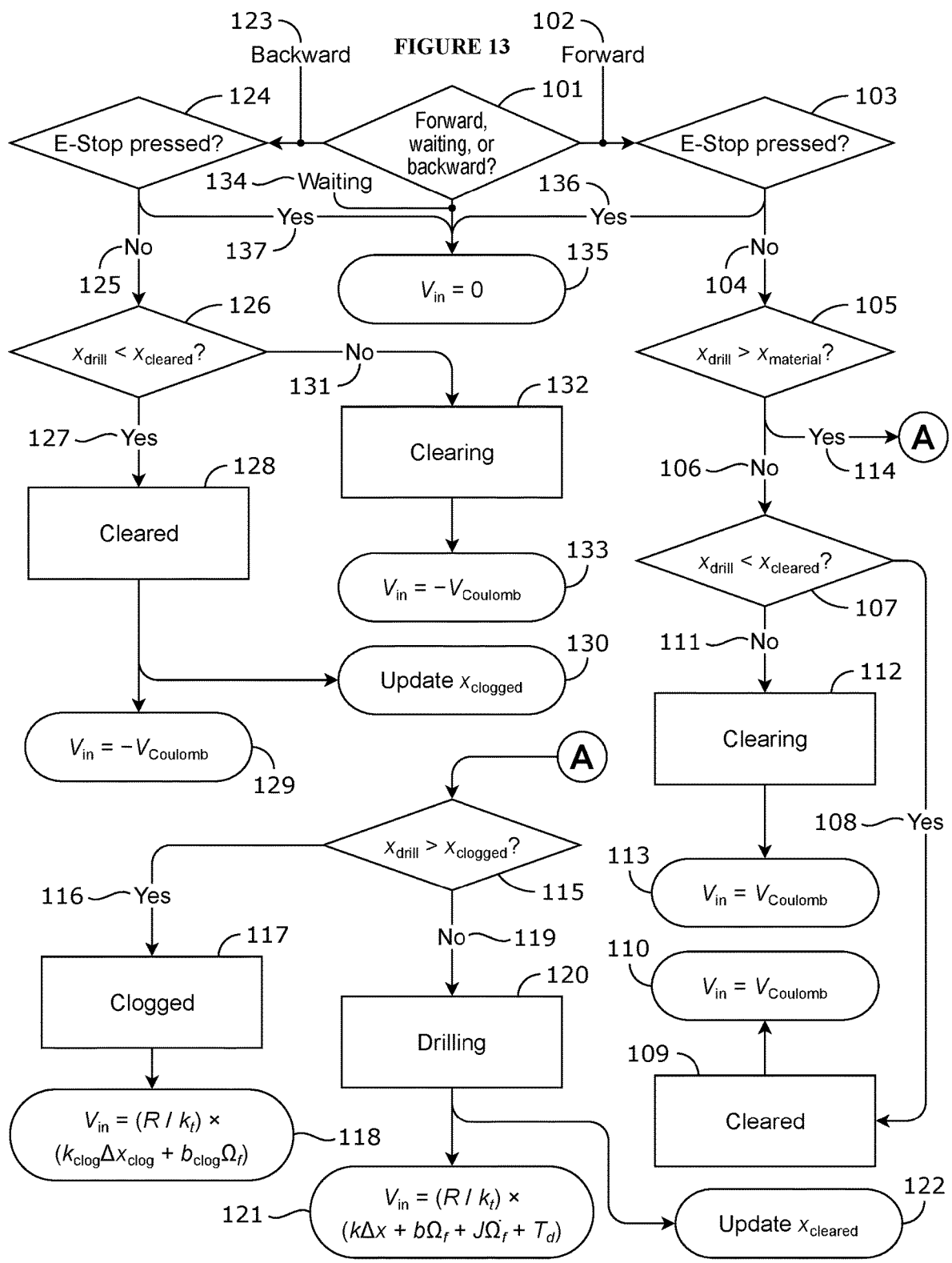
FIG. 13 is a functional diagram of the haptic controller.

A functional diagram of the haptic controller and the finite state machines' implementation, which is programed into the microcontroller (50) is shown in FIG. 13. Using the data collected from the real lathe, it is known that the average torque needed to break the static frictional forces is 0.25 N-m. From the model used in the controller, it is established that the voltage needed to produce 0.25 N-m is 1.2V. It is also determined that this voltage output is not significant enough to overcome the coulomb frictional forces in the other direction. This is significant because it means the controller is able to output this voltage at all times when needed to simulate coulomb torque on the user.

In order to simulate the resistance felt when the real drill flute fills up with chips and clogs, the controller's finite state machine, which is programmed into the micro controller, includes a "CLOGGED" state. The preferred way to realistically replicate this phenomenon is to implement a "virtual wall" using a proportional-derivative (PD) controller on position. The desired drill depth input is the depth at which the drill should clog, which was found to be 0.83 inches from analyzing the data collected on the real lathe. The controller gains used in the equation found in the red box in FIG. 13 are k_clog=125 and b_clog=500.

FIG. 13 is a functional diagram of the haptic controller. The controller implemented in a microcontroller (50) uses the motor's encoders to track which direction the handwheel is being spun, as well as to track the virtual drill's location in the virtual stock material. Different voltages, $V_{in}$ are sent to the motor depending on which state the controller is in. The states are shown in capital letters in the diagram. Starting at (101), the handwheel (43) is turned in the forward direction (102). If, the e-stop (103) controlled by the self-locking latching push button switch (45) is not activated (104), then the microcontroller determines whether $x_{drill}$ is greater than $x_{material}$ (105). If $x_{drill}$ is not greater than $x_{material}$ (106) then the microcontroller determines if $x_{drill}$ is less than $x_{cleared}$ (107). If $x_{drill}$ is less than $x_{cleared}$ (108) then the microcontroller determines that the hole being drilled in the material is cleared (109) and sets the finite state machine to cleared and the microcontroller sends a signal to the motor to set the voltage equal to $V_{Coulumb}$ (110). When referring to FIG. 13, $x_{drill}$ is the current position of the tip of the drill, $x_{material}$ is the greatest last position of $x_{drill}$ so if $x_{drill}$ is greater than $x_{material}$, then the virtual drill is currently in contact with the material and is drilling, $x_{cleared}$ is the distance needed to be retracted to clear the virtual chips off of the tool bit, $x_{clogged}$ is the distance needed to clog the virtual tool bit. $X_{clogged}$ and $x_{cleared}$ are based on mathematical models.

Returning to (107) is $x_{drill}$ is greater than $x_{cleared}$ (111) then the microcontroller determines that the hole being drilled in the material is clearing (112) and sets the finite state machine to clearing and the microcontroller sends a signal to the motor to set the voltage equal to $V_{Coulumb}$ (113).

Returning to (105) if $x_{drill}$ is greater than $x_{material}$ (114) then the microcontroller determines if $x_{drill}$ is greater than $x_{clogged}$ (115). If the answer is yes (116) then the microcontroller determines that the hole being drilled in the material is clogged (117) and sets the finite state machine to clogged and the microcontroller sends a signal to the motor to set the voltage equal to the equation $(R/k_t)(k_{clog}\Delta x_{clog}+b_{clog}\Omega_f)$ (188) where R and $k_t$ are constants, $k_{clog}$ is a variable based on the material selected, and $\Delta x_{clog}$ and $\Omega_f$ are user input variables. Returning to (115) if $x_{drill}$ is less than $x_{clogged}$ (119) then the microcontroller determines that the lathe is drilling (120) and the microcontroller sends a signal to the motor to set the voltage equal to $(R/k_t)(k\Delta x+b\Omega_f+J\dot{\Omega}_f+T_d)$ (121) where R and $k_t$ are constants, k, b, J and $T_d$ are variables based on the material selected, and $\Delta x$, $\Omega_f$ and $\dot{\Omega}_f$ are user input variables being tracked by the microcontroller at all times based upon the position of the handwheel. The microcontroller also sends a signal to the controller to update $x_{cleared}$ (122).

Returning to (101), the handwheel (43) is turned in the backwards direction (123). If, the e-stop (124) controlled by the self-locking latching push button switch (45) is not activated (125), then the microcontroller determines whether $x_{drill}$ is less than $x_{cleared}$ (126). If $x_{drill}$ is less than $x_{cleared}$ (127), then the microcontroller determines that the hole being drilled in the material is cleared (128) and sets the finite state machine to cleared and the microcontroller sends a signal to the motor to set the voltage equal to $V_{coulumb}$ (129) and updates $x_{clogged}$ (130).

Returning to (126) if $x_{drill}$ is greater than $x_{cleared}$ (131), then the microcontroller determines that the hole being drilled in the material is clearing (132) and sets the finite state machine to clearing and the microcontroller sends a signal to the motor to set the voltage equal to $V_{Coulumb}$ (133).

Returning to (101), the handwheel (43) is waiting (134) then the microcontroller sends a signal to the motor to set the voltage to zero (135). Likewise, if the e-stop in (103) is pressed (136) or the e-stop in (124) is pressed (137) then the microcontroller sends a signal to the motor to set the voltage to zero (135).

The emergency stop button is connected to the microcontroller reset pin to indicate the "E-Stop" state so that the entire system, including all variables and the encoder's counts could be reset between uses of the simulator.

The haptic controller preferably simulates torque within 30% accuracy, though it is preferred for within 20%, and more preferred within 15%, 10%, or 5% accuracy. For most embodiments, an accuracy within 15% is suitable as the subtle differences are able to be felt for the torque feedback. Additionally, the controller must be able to simulate coulomb torque of 0.25 Nm which is achieved by implementing a constant output voltage in the controller of at least 1.2V when not drilling into material. The controller must also be able to lock the position of the handwheel (43) when in a "CLOGGED" state and fully stop the user from moving the handwheel (43). This is achieved by using a proportional-derivative (PD) controller on position to replicate a virtual wall. The controller must also be able to cut voltage at any point (Vin=0V). The is achieved by utilizing the microcontroller (50) to read the signal from the e-stop button such as a self-locking latching push button switch (45). Furthermore, the controller must keep track of virtual depths throughout the user's experience which is accomplished when the microcontroller (50) reads the encoder on the motor (52).

Embodiment 3. Data Collection

Figure 14A:
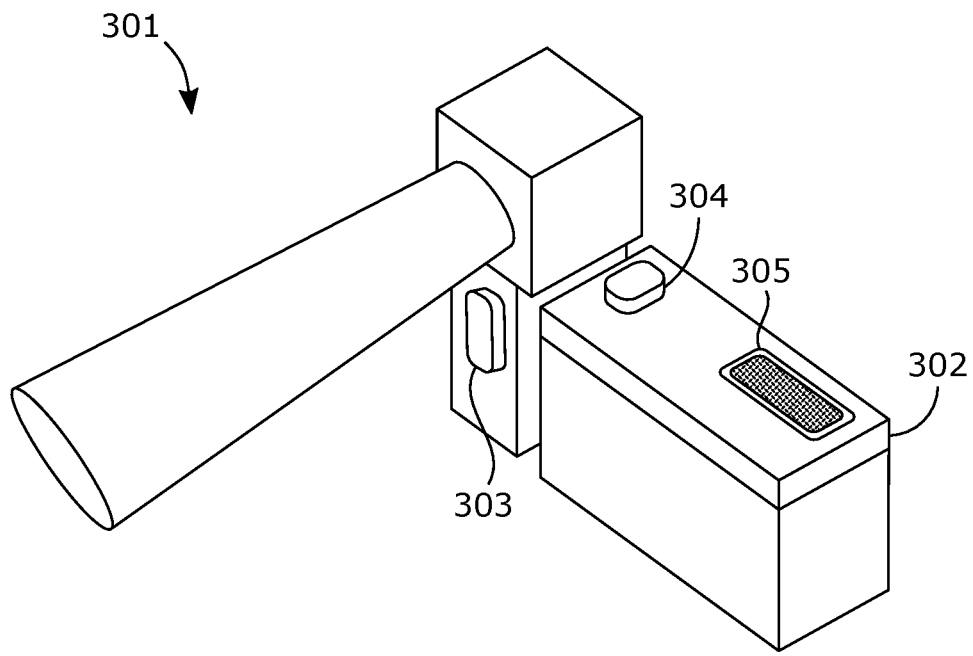
FIGS. 14A and 14B are data rigs, with FIG. 14A being a torque data collection rig and FIG. 14B being an encoder data collection rig.
Figure 14B:
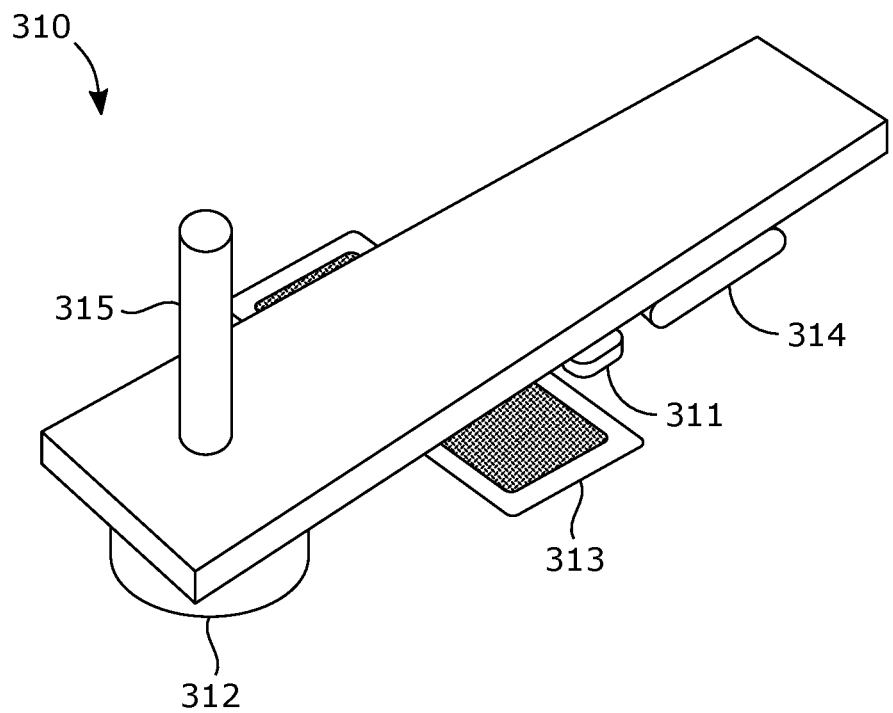

The present invention is dependent on having numerous accurate datapoints collected from the ideal operation of a manual machine as well as the incorrect operation of a manual machine. Presently there is no accurate way to collect and organize this data. However, it is understood that such data could be obtained in a number of ways and could be publicly available in certain instances. Accordingly, the present invention includes a device and method for collecting data, wherein the data can be utilized within a database and a haptic feedback simulator to allow for virtual training for machining operation. Useful data is obtained from a manual machine, such as a lathe, using data collection rigs, such as those shown in FIGS. 14A and 14B and attaching appropriate instrumentation to find the angular velocity and acceleration, the torque applied, and the depth of the drill into the material. A first device, such as the torque data collection rig (301) shown in FIGS. 14A, includes a microcontroller (302) such as an Arduino Nano, a load cell (303), a means of communicating with a second computing device (304), such as a Bluetooth module, a printed circuit board (305), and a power source such as 4 AAA batteries, is used to collect torque data, such as the torque of the handwheel, the torque of the drill, or the torque of the spindle from the manual machine. In the present invention, the torque data collection rig (301) measures the torque it takes for user to rotate the handwheel of the tailstock when the drill is cutting into the material. A second device, such as the encoder data collection rig (310) shown in FIG. 14B, consists of a microcontroller (311), such as an Arduino Nano, an encoder (312), a printed circuit board (313), a power source (314) such as 4 AAA batteries, and a shaft extender (315). The encoder data collection rig (310) tracks the drill depth, which in turn is used to obtain the tailstock handfeed wheel's angular velocity and acceleration and collects the position and angular velocity and acceleration data of the tailstock. The housing for the data collection rigs shown in FIGS. 14A and 14B can be any sturdy material, such as metal, plastic or acrylic, capable of containing the internal components. In the nonlimiting example of a manual lathe such as those shown in FIG. 1, the torque data collection rig (301) is mounted on the tailstock handfeed wheel (13) and the encoder data collection rig (310) is mounted to the tailstock assembly (11) with the shaft extender (315) touching the top of the drill chuck mounted in the tailstock quill (12).

The load cell (303) is calibrated, for example, by using a 1 kg weight, which is hung by the torque data collection rig (301) handle's end to replicate the force felt when using the lathe's tailstock handfeed wheel. Nonlimiting examples of the specifications of the components of the torque data collection rig (301) and the encoder data collection rig (310) are in Table 1.

TABLE 1

DATA COLLECTION DEVICE SPECIFICATIONS

| Component | Specs |
|---|---|
| REXQualis Nano v3.0, 3 pcs Nano Board | 5 V operating voltage |
| Load Cell w/Amplifier | 5-10 kg force measurements Operating voltage: 2.7-5 V |
| HC-05 Bluetooth Module | Operating voltage: 3.6-6 V |
| Optical Rotary Encoder | 2000 PPR 5 V line driver |
| Duracell CopperTop AAA Alkaline Batteries (ten count) | 1.5 V |
| Battery Holder (pack of 8) | Holds four AAA batteries |
| ElectroCookie Prototype Board Breadboard Style PCB Solder Board | 3.5" × 2.05" |

In one non-limiting example, data was collected by mounting the torque data collection rig (301) and the encoder data collection rig (310) on the tailstock assembly of a lathe. These trials used a drill bit size of ¼" and the workpiece size was ⅝" aluminum. This size drill bit was selected due to the commonality of the size in manufacturing and the ⅝" aluminum stock was chosen due the fact that it is thick enough to prevent too much elastic deformation in the workpiece, possibly a result changing factor. The first trial consisted of drilling at an average speed, the second trial at half speed, the third trial at quarter speed, and the last trial at double drill speed. Throughout all these trials, the operator was asked to clog the workpiece until the drill could no longer drill forward. After this, the operator would clear and continue. The speed was relative to the operator's average drilling speed to produce torque feedback based on an experienced machinist. For the whole data collection process, the operator drilled using the handle of the torque data collection rig (301) to measure the torque applied. Additionally, the shaft on the encoder data collection rig (310), mounted on the side of the tailstock, tracked the position, speed, and acceleration of the drill chuck. With this data, the torque feedback is modeled with the appropriate inputs.

Figure 9:
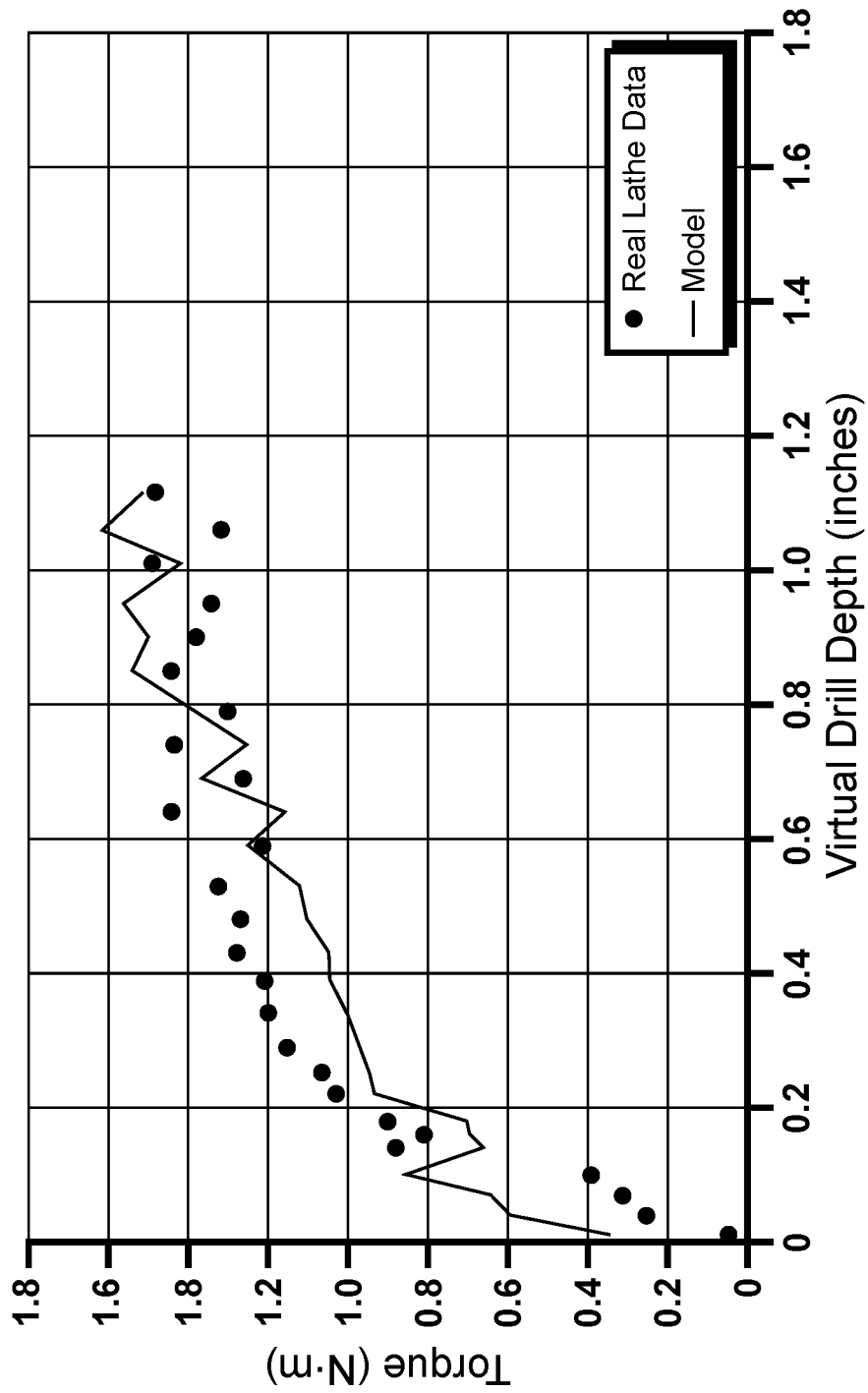
FIG. 9 is a chart showing torque vs. time data collected from the lathe.

The present embodiments utilize a model for calculating the resistance torque which the lathe exhibits on the user when drilling a hole is dependent on how deep the drill is in the material, $\Delta x$, the rotational speed and acceleration at which the drill is moving, $\Omega_f$ and $\dot{\Omega}_f$ and coulomb friction torque on the drill bit, $T_D$. The angular speed is placed through a first order filter with a time constant of 0.2 seconds, denoted by the subscript f denoting filtered. The following equation is established:

$$T = k\Delta x + b\Omega_f + J\dot{\Omega}_f + T_D \tag{Eq 1}$$

where T is the resistance torque as measured by the load cell and data collection apparatus, k is a spring-constant, b is a damping constant, J is the inertia, and $T_D$ is the coulomb friction torque. This model is fitted using linear regression to the real lathe data as shown in FIG. 9 and the fitted parameters can be noted in Table 2, which shows the parameters for the equations used to calculate output voltage shown in FIG. 13 $k_t$ and R are the same values used in the CLOGGED output as well as the DRILLING output.

TABLE 2

PARAMETERS

| Parameter | $k_t$ | R | k | b | J | $T_D$ |
|---|---|---|---|---|---|---|
| Units | N·m/A | Ω | N·m/in | N·m-sec/rad | N·m-sec²/rad | N·m |
| Value | 0.392 | 2.0 | 0.578 | 0.143 | 7.55 × 10⁻³ | 0.35 |

Next torque is converted to voltage. This conversion uses motor specifications $k_t$ and R, shown in Table 2 and the following equation:

$$V_{in} = (R/k_t)(k\Delta x + b\Omega_f + J\dot{\Omega}_f + T_d) \quad \text{(Eq. 2)}$$

Equation 2 is used to determine what voltage is sent to the motor when the user virtually drills into the virtual material using the controller (40). Accordingly, it is this voltage that, when applied to the motor determines the proportional torque to the wheel.

Embodiment 4: The Database

Database comprises a set of values corresponding to various machines, as well as various variables to be used on each machine. The data entered within the database may be manually entered, for example, as collected from simulations. In certain applications, published data may exist based on particular variables.

The values corresponding to various machines serves as the basis for calculating certain torque responses within the embodiment of the simulator. The determined data from Embodiment 3, or as acquired from other sources, becomes a set of constants for any instantaneous measurement within a given simulation. In each case, the database stores the necessary data for a given simulation and the various instances that can be experienced by a user. Wherein an algorithm utilizes the inputs from the user (the variables) to then calculate and provide the torque feedback to the user.

The database can be updated with additional data, manually or automatically. Manual input may come from public or published sources, or from data capture as detailed above. Automatic updates can be provided from simulations or data gathering to populate the database.

Embodiment 5: User Interface and Tutorials

The present invention is an effective, independent learning tool capable of teaching the processes of operating any manual machine. In this non-limiting example, the machine is a lathe. The user interface consists of three key components: learning, activities, and practice.

In certain embodiments, the simulator further comprises a tutorial element, which teaches a naive user the specifics of a lathe drilling operation. The tutorial instills declarative and procedural knowledge, both of which are essential to learning. Declarative knowledge is knowing that certain information is true or not true, while procedural knowledge is knowing how to do a specific act. The tutorials embedded in the system foster declarative and procedural knowledge in several ways. First, a point of view video presents the drilling operation step by step. This video is further broken down into the key steps of each procedure to create a list consisting of those steps. The tutorial presents each step using text to describe the step, voiceover to explain the step in more detail, and a video played on loop of completion of the step. Once the voiceover for the current step is complete, users are then able to either continue to the next step or replay the current step to review. Along with this, users can access a part drawing of the piece being manufactured as well as a labeled diagram of the lathe at any point during the tutorial.

Additionally, to further promote the retention of knowledge in the application, quiz activities are embedded throughout the tutorial. Consisting of multiple-choice questions, multiple answer questions, and interactive tasks, these activities allow users to test their knowledge of key components necessary to complete the drilling operation. Questions include lathe part recognition, knowledge of safety practices, procedure outlining, etc. After answering the questions in the GUI, users are then shown the correct answer along with a detailed description of the answer. Users are then shown their score and a text file including the user's answers is saved locally to the application's directory.

Finally, to complete the user experience, users practice newly taught skills virtually by interacting with the controller (40) which controls a virtual environment accurately representing a lathe. A virtual model of the lathe, appearing in the GUI and the operations being performed via the controller (40) are combined with particle simulations shown on the GUI, to recreate metal chips forming, as well as accurate audio.

Scripts allow for serial communication between the microcontroller (50) such as the Arduino Nano and the GUI. Parameters such as encoder counts are communicated in order to allow for the virtual handwheel and drill bit to move accurately with the physical device. Embedded at appropriate points throughout the tutorial, users are prompted to utilize the system and virtually complete a center drilling operation as well as main drilling operation. After calibrating the virtual handwheel in the GUI so that it correctly lines up with the virtual handwheel (43), voiceover and pop-up instructions guide the user as they drill into the virtual piece. As they drill, various visual cues appear in the GUI indicating that the piece is clogging, clogged, or has been cleared. This allows inexperienced operators to understand what clogging feels like and how to properly clear the chips. Within this practice scene, users have the ability to switch their virtual view of the lathe, read their depth into the piece using the rulers on the drill chuck, access the part drawing, and restart the operation at any point. Once the drilling operation is complete, users are able to continue with the tutorial.

A nonlimiting example of the simulation as shown in the GUI is as follows:

Before Use:

A voiceover along with text explains the procedure below (text will appear along with video and a voiceover; listen to voiceover then click continue when you want to proceed to the next step). The voiceover and text also make it explicitly clear that until a specific icon (to be determined) appears in the top left corner of the screen, the instructions will all be purely video/audio based on-screen. The voiceover ends with warning the students that there will be a quiz following the completion of the operation and to "be sure to pay attention!"

For Each Main Operation in the Drilling Process:
Text is displayed at the top of the screen, generally describing the next step.
i.e., "Next, we slide the tailstock into place"
A looping video of the step is shown from the point of view of the technician (GoPro head-mounted video).
A voiceover, explaining the step in more detail, is played:
i.e., "Next, we slide the tailstock into place. The tailstock is the part of the lathe highlighted in the video below. Once unlocked, place both hands on the top of the tailstock and slide forward on the guided rails until the drill bit is near the piece. Be sure to keep your hands away from the bottom of the tailstock, as there are pinch points."
When the voiceover is complete, a "Continue" button will appear, allowing the student to move to the next step.
Repeat above for proceeding steps.

When Haptic Device is Used:
A voiceover/video explains that the student will now be using the haptic device and what they will be doing based on the prior instruction given.
The student completes the haptic task.

At the End of the Simulation:
A multiple-choice quiz appears, testing the declarative knowledge of the student, asking about specifics of both the lathe parts as well as procedure.

Embodiment 6: User Method of Use

Figure 15:
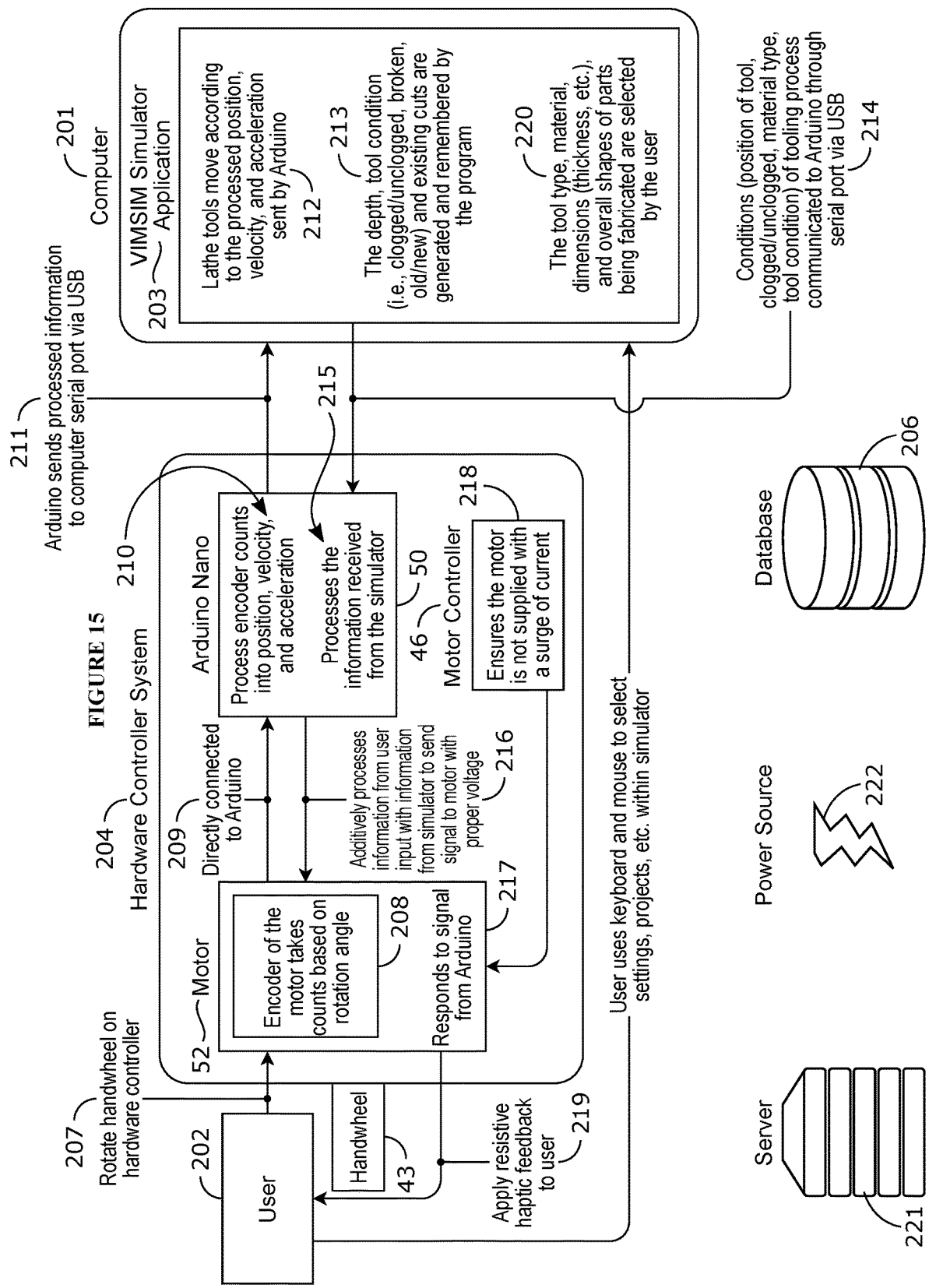
FIG. 15 is a flowchart detailing the operation of the simulator.

The following is a non-limiting example of using the system to simulate drilling a hole using a manual lathe. The system's software can run on any computer. The computer (201), which is shown in FIG. 15, may be any type of computer such as a laptop computer, desktop computer, tablet, or smart phone as detailed herein. In an embodiment, servers may include database server functionality to manage database or another database. Although not shown, architecture variations may allow for database to have a dedicated database server machine. Database may be any suitable database such as hierarchical, network, relational, object-oriented, multimodal, nonrelational, self-driving, intelligent, and/or cloud based to name a few examples. Although a single database is shown in FIG. 15, in embodiments database may comprise more than one database, the more than one databases may be distributed across many locations, and data may be redundantly recorded in the more than one database. Furthermore, data may be stored in blocks that are part of a chronological blockchain and may be dispersed across a decentralized distributed ledger. Blocks of data in a blockchain are linked in such a way that tampering with one block breaks the chain. Thus, digital data stored in a blockchain is verifiable with a high level of integrity, should it be so desired.

As shown in FIG. 15, the user (202) accesses the computer (201) and launches the simulator application (203). It is understood that the simulator application may be downloaded to the computer (201) or can be stored in cloud-computing storage and accessed by the computer via a Web interface. The user (202) connects the hardware controller system (204) to the power source (222). The user (202) connects the hardware controller system (204) to the computer (201) either wired for example via USB or wirelessly, for example via blue tooth. The user (202) selects the machine to be used from a list of available machines such as lathe, milling machine, etc. The simulator application (203) populates the GUI with available choices for the machine selected for example, tutorial/training mode, testing mode or manufacturing mode. The user selects the mode to be launched which the simulator application (203) launches in the GUI. The simulator application (203) queries the database (206) and identifies the proper finite state machine algorithm such as those shown in FIGS. 13 (118) and (121). The simulator (203) queries the database (206) and identifies the proper variables such as those shown in Table 2. The user (202) calibrates the handwheel (43) to the graphical representation of the handwheel in the simulator application (203). The user launches the selected mode, in this non-limiting example, drilling a hole using a lathe. The simulator application (203) populates the GUI with a graphical representation of a lathe. Next, the user selects the material to be used in the simulation, in this example ⅝" aluminum, and the user selects the size drill to be used in the simulation, in this example ½" (220). The simulator application (203) quires the database (206) to identify the correct variables for this material and drill size. The user starts the simulation and the spindle begins turning at a certain number of RPMs in the GUI of the simulator application (203).

Next, the user rotates the handle on the hardware controller (207). The encoder of the motor (52) takes counts based on the rotational angle (208). The motor sends this signal (209) to a microcontroller (50). The microcontroller (50) processes the encoder counts into position, velocity and acceleration (210). The microcontroller (50) sends the processed information to the computer serial port via USB (211), although it could also be transmitted wirelessly. The processed information is populated into the simulator application (203). The virtual lathe tool, in this instance, the drill, is depicted in the GUI as moving towards or away from the spindle (2) according to the processed position, velocity and acceleration sent by the micro-controller (212).

Next, the simulator application (203) executes the flowchart and algorithms from FIG. 13 and notes the depth, tool condition (i.e., clogged/unclogged, broken, old/new) as an existing cut and retains the information in the memory of the simulator application (213). The simulator application, via the computer's USB connection, send the conditions (position of tool, clogged/unclogged, material type, tool condition) of the tooling process back to the micro-controller (214). The micro-controller processes the information received from the simulator application (215) and converts the signal to volts using the algorithms from FIG. 13. The micro-controller additively processes the information from the user input with the information from the simulator to send a signal to the motor indicating the proper voltage (216). The motor responds to the signal from the micro-controller (217) which is monitored by the motor controller (46) which ensures the motor is not supplied with a surge of current (218). The motor applies resistive haptic feedback to the user (219) and the process repeats itself starting with (207) as the user continues to operate the handwheel (43).

This creates a virtual environment with accurate models of machinery to scale. Drilling in simulator without retracting the drill bit causes debris to build up inside hole. If the user neglects to rotate the handwheel in both the forward and backwards directions, it results in the haptic feedback causing resistance in the handwheel making it harder to turn and giving the user a very realistic tactile experience while visually orienting the position of the tool on the simulator device.

In certain embodiments, the system and display is utilized with a headset, for example virtual reality style headsets. Thus, a user could rotate a device in the virtual headset and receive feedback through the various components of such virtual systems. Furthermore, the types of machines and skills able to be taught are not so limited by this disclosure. Indeed, those skills requiring precise hand or foot operations (or combinations of hand and foot movements) which are required in manual operations can be taught in such a simulator. For example, many other hands-on skills, including operations of drills, hammers, construction machines, cranes, bulldozers, etc. tractors, can provide the same hands-on haptic feedback needed for novice or naïve users to obtain some of the skills in a remote or learning module, before engaging with the real machines.

Accordingly, the broadest embodiments, the embodiments detail a haptic feedback system that incorporates a set of known forces, and which, through the operation of a user device, provides user inputs. Wherein the haptic feedback system provides a response to the user based upon the proximity of the user inputs to the preferred or ideal inputs for a given scenario. Thus, a user can practice using a mill or lathe, as non-limiting examples, and appropriately turning a wheel to modify the position of the tool to perform a certain cut within a given material. Wherein the precise material, the tool being utilized, as well as other potential variables can all be incorporated into a virtual setting—wherein feedback is given when practicing performance of the certain cut, and providing the user with actual haptic feedback to simulate the real experience.

What is claimed is:

1. A machining simulator for providing haptic feedback to a user, said machining simulator comprising:
    a processor coupled to a simulation machine, said processor configured to receive at least one input from said simulation machine to define at least one variable corresponding to a simulation;
    wherein said at least one variable is defined within a database accessible to said simulator;
    upon receipt of the at least one input into said simulation machine, generating a haptic feedback response if the at least one input is greater than or less than a defined range within said database; and
    further comprising a drill configured for engaging with a virtual material wherein there are at least three variables defined within the database, said at least three variables corresponding to a depth of the drill in the virtual material, a rotational speed and acceleration at which the drill is moving, and a coulomb friction torque on the drill.

2. The machining simulator of claim 1 wherein the defined range is within 15% of an ideal value, which is the value defined within the database corresponding to the particular at least one variable defined by the simulation.

3. The machining simulator of claim 1 wherein the input from the simulation machine is provided via a rotational force.

4. The machining simulator of claim 1 wherein the haptic feedback is proportionally given based on a proximity of the input to an ideal value.

5. The machining simulator of claim 1 wherein the simulation machine is a rotatable wheel or a joystick.

6. The machining simulator of claim 5 wherein the simulation machine receives haptic feedback, wherein the haptic feedback is provided by a motor within said simulation machine that receives a voltage based upon a value of the input.

7. The machining simulator of claim 6 wherein the voltage is calculated based upon a formula: $V_{in}=(R/k_t)(k\Delta x+b\Omega_f+J\dot{\Omega}_f+T_d)$
    wherein $V_{in}$ is voltage, R is a constant, $k_t$ is a constant, k, b, J, and $T_d$ are variables representing the virtual material selected, and $\Delta x$ and $\Omega_f$ are user input variables being tracked by a microcontroller based upon a position of the rotatable wheel or the joystick.

8. The machining simulator of claim 6 wherein the motor provides a force opposite to the rotation of the simulation machine.

9. The machining simulator of claim 6 wherein the motor comprises a metal gearmotor with an encoder wherein the encoder measures the input generated by the simulation machine wherein said motor is connected to the processor, said motor configured to generate an output of an appropriate torque to provide the haptic feedback response.

10. A machining simulator comprising:
    a computer, a computer implemented software running on said computer, a display providing a graphical user interface (GUI), and a simulation input device;
    wherein said computer further comprises a database, said computer implemented software defining a simulation wherein said simulation comprises a set of data stored within the database;
    wherein the simulation input device comprises at least a microprocessor to receive and process input and a motor to receive a voltage input to provide a responsive haptic feedback;
    wherein the machining simulator comprises a drill configured for engaging with a virtual material wherein there are at least three variables defined within the database, said at least three variables corresponding to depth of the drill in the virtual material, rotational speed and acceleration at which the drill is moving, and coulomb friction torque on the drill;
    wherein the simulation input device provides at least one input; and
    wherein the at least one input is compared to a value within the database and the microprocessor generates a proportional signal to the motor based upon a proximity of the at least one input to the value within the database.

11. The machining simulator of claim 10 wherein the proportional signal is a voltage according to a formula: $V_{in}=(R/k_t)(k\Delta x+b\Omega_f+J\dot{\Omega}_f+T_d)$
    wherein $V_{in}$ is voltage, R is a constant, $k_t$ is a constant, k, b, J, and $T_d$ are variables representing the virtual material selected, and $\Delta x$ and $\Omega_f$ are user input variables being tracked by a microcontroller based upon a position of a rotatable wheel or a joystick.

12. The machining simulator of claim 10 wherein the simulation corresponds to a lathe.

13. The machining simulator of claim 10 wherein the value within the database defines at least an ideal rotation speed or an ideal depth.

14. The machining simulator of claim 10 wherein the input corresponds to a rotation speed or a depth.

15. A method of providing a virtual simulation of a machining experience comprising:
    a. electing a simulation of a machining experience on a virtual simulation device by a user;
    b. identifying a set of data corresponding to said simulation from a database;
    c. generating an input value from a rotational device connected to said virtual simulation device, said rotational device comprising a drill configured for engaging with a virtual material wherein there are at least three variables defined within the database, said at least three variables corresponding to depth of the drill in the virtual material, rotational speed and acceleration at which the drill is moving, and coulomb friction torque on the drill;

d. receiving an input generating by said user at a microcontroller on said virtual simulation device;

e. determining an expected input value from the set of data corresponding to said simulation and comparing the input to the expected input value; and f. generating a proportional electronic signal from the microcontroller to a motor on said virtual simulation device and thereby providing haptic feedback proportional to the difference between the input and the expected input value.

16. The method of claim 15 wherein the simulation corresponds to a lathe, a milling machine, a drill, a tractor, a bulldozer, or a crane.

17. The method of claim 15 wherein the proportional difference between the input and the expected input value provides for a 15% variance wherein the input within the 15% variance is deemed the same.

18. The method of claim 15 wherein the rotational device is connected to the motor, wherein said motor comprises an encoder, wherein the encoder rotates with the rotational device and defines a position corresponding to the input value.

19. The method of claim 15 wherein the proportional electronic signal generates said electronic signal to said motor to provide a counterrotational force, which is the haptic feedback.

* * * * *